US012112555B1

(12) United States Patent
Lee et al.

(10) Patent No.: US 12,112,555 B1
(45) Date of Patent: Oct. 8, 2024

(54) DROWSY DRIVING DETECTION

(71) Applicant: Samsara Inc., San Francisco, CA (US)

(72) Inventors: Sung Chun Lee, Fairfax, VA (US); Nathan Hurst, Seattle, WA (US); Yan Wang, Mercer Island, WA (US); Olamide Akintewe, Potterville, MN (US); Justin Levine, Erie, CO (US); Kenshiro Nakagawa, San Francisco, CA (US); Cole Jurden, Kansas City, MO (US); Rachel Demerly, New York, NY (US); Aravindh Ramesh, San Francisco, CA (US); Kevin Lai, Redmond, WA (US); Jovanna Bubar, Los Angeles, CA (US); Shirish Nair, Shoreline, WA (US); Maisie Wang, Seattle, WA (US)

(73) Assignee: Samsara Inc., San Francisco, CA (US)

( * ) Notice: Subject to any disclaimer, the term of this patent is extended or adjusted under 35 U.S.C. 154(b) by 0 days.

(21) Appl. No.: 18/634,353

(22) Filed: Apr. 12, 2024

(51) Int. Cl.
*G06V 20/59* (2022.01)
*G06V 10/774* (2022.01)
*G06V 40/16* (2022.01)

(52) U.S. Cl.
CPC .......... *G06V 20/597* (2022.01); *G06V 10/774* (2022.01); *G06V 40/161* (2022.01); *G06V 40/168* (2022.01); *G06V 40/174* (2022.01)

(58) Field of Classification Search
CPC .. G06V 20/597; G06V 10/774; G06V 40/161; G06V 40/168; G06V 40/174
See application file for complete search history.

(56) References Cited

U.S. PATENT DOCUMENTS

| | | | |
|---|---|---|---|
| 10,155,445 B2 * | 12/2018 | Nemat-Nasser | G08B 21/06 |
| 10,745,009 B2 * | 8/2020 | Jang | G06V 20/56 |
| 11,318,949 B2 * | 5/2022 | el Kaliouby | G06Q 30/0265 |
| 11,830,259 B2 * | 11/2023 | Ren | G06V 40/172 |
| 11,993,277 B2 * | 5/2024 | Julian | B60W 50/14 |
| 2024/0096116 A1 * | 3/2024 | Alpert | G06N 3/08 |

OTHER PUBLICATIONS

"Unprecedented Visibility More Platform Power Everything You Need to Know From the Vision 24 Motive Innovation Summit", [Online]. Retrieved from the Internet: https: gomotive.com blog vision-24-product-announcements , (Apr. 10, 2024), 13 pgs.

* cited by examiner

*Primary Examiner* — Phuoc Tran
(74) *Attorney, Agent, or Firm* — Schwegman Lundberg & Woessner, P.A.

(57) ABSTRACT

Techniques are presented for detecting when drivers drive while drowsy. In some implementations, a drowsiness model is trained with data associated with inward videos and outward videos captured during a trip. The inward videos capture the inside of the cabin with the driver, and the outward videos capture the view in front of the vehicle in the direction of travel. Further, a device at the vehicle periodically calculates a drowsiness scale index value that indicates the level of drowsiness of the driver. Calculating the drowsiness scale index value includes obtaining a set of inward frames from the inward videos; for each inward frame, creating a face image by cropping the inward frame; obtaining a set of outward frames from the outward videos; calculating inward embeddings of the face images and outward embeddings of the outward frames; and calculating, by the drowsiness model, the drowsiness scale index value.

20 Claims, 14 Drawing Sheets

DROWSY DRIVING DETECTION

TECHNICAL FIELD

The subject matter disclosed herein generally relates to methods, systems, and machine-readable storage media for detecting signs of driver fatigue, distraction, or impairment.

BACKGROUND

Operating a vehicle while in an impaired state constitutes a highly hazardous act. The American Automobile Association (AAA) has conducted a study that indicates that driver fatigue, or drowsiness, is implicated in 20% of fatal collisions, surpassing the risks associated with driving under the influence of alcohol. Individuals experiencing drowsiness exhibit delayed reflexes, increased susceptibility to distractions, and a propensity for suboptimal decision-making when controlling a vehicle. Despite the recognized risks associated with drowsy driving, this behavior remains widespread among drivers. Surveys reveal that 40% of individuals admit to having fallen asleep or experienced episodes of nodding off while operating a vehicle.

Regulation (EU) 2019/2144, recently enacted within the European Union, stipulates that motor vehicles falling under categories M and N, which include passenger and commercial vehicles, shall be equipped with Driver Drowsiness and Attention Warning (DDAW) systems. The implementation of this mandate is scheduled to commence on 6 Jul. 2022 for new vehicle types and on 7 Jul. 2024 for all newly manufactured vehicles. The DDAW system is characterized as a mechanism that evaluates the alertness of the operator by analyzing the vehicle's system performance and, when necessary, issues an alert to the operator. Specifically, the DDAW system is required to detect or recognize driving or steering patterns indicative of an operator experiencing diminished alertness due to fatigue and to engage with, as well as alert, the operator through the vehicle's human-machine interface.

Evaluation of a driver's degree of fatigue through image analysis poses inherent difficulties, especially in establishing a definitive chronological sequence from the visual data. Moreover, when utilizing dashboard camera footage, the accuracy of facial landmark detection may not meet anticipated standards, resulting in possible inaccuracies in evaluations. Additionally, concrete constraints exist pertaining to the available computing devices in the vehicle, particularly concerning their storage and processing capacities, which may impact the efficiency and efficacy of any solution applied.

BRIEF DESCRIPTION OF THE DRAWINGS

Various appended drawings illustrate examples of the present disclosure and cannot be considered limiting its scope.

DETAILED DESCRIPTION

Figure 1:
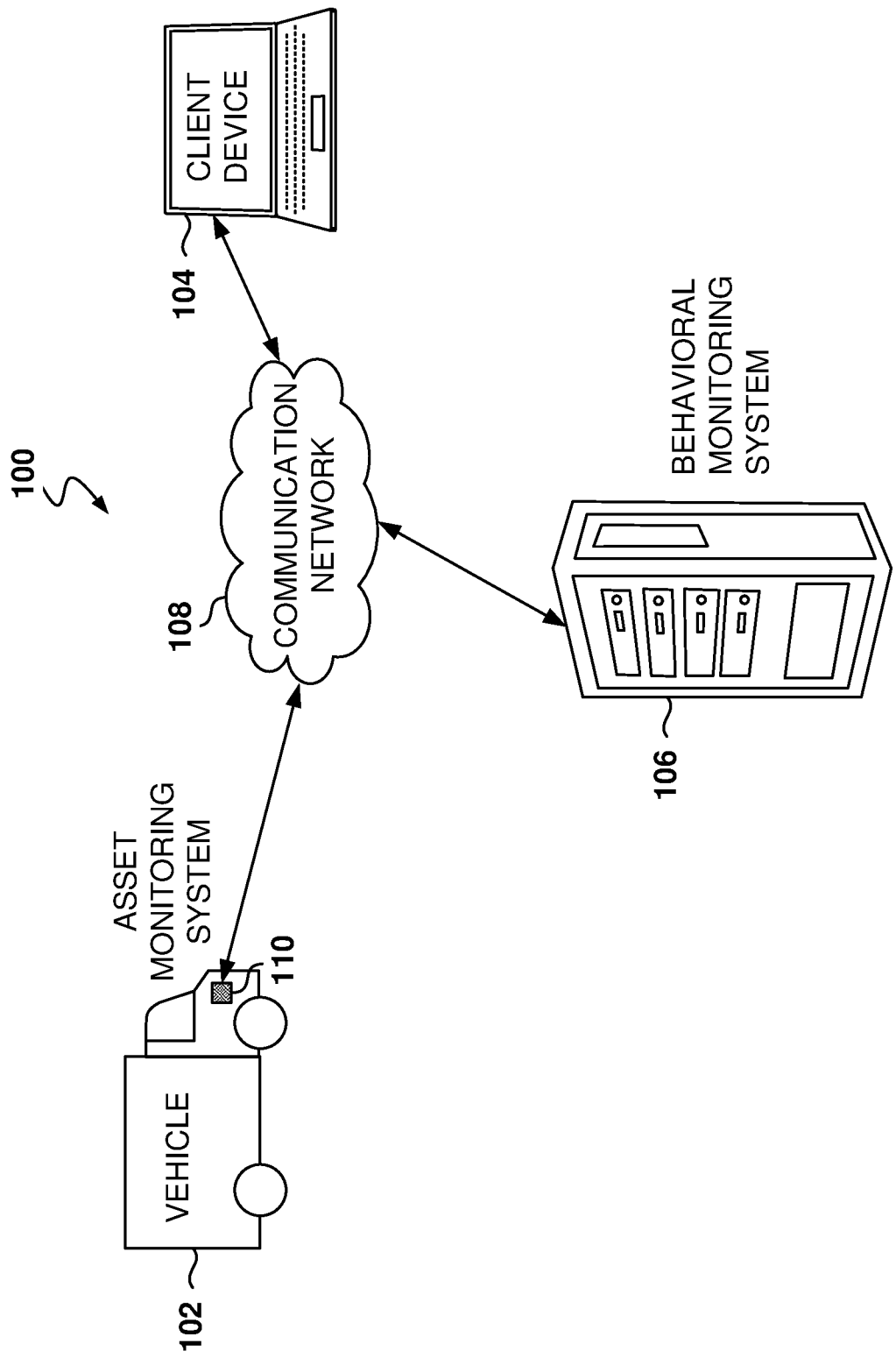
FIG. 1 shows a system for vehicle rider behavioral monitoring, according to some examples.

Example methods, systems, and computer programs are directed to detecting when drivers are drowsy while driving. Examples merely typify possible variations. Unless explicitly stated otherwise, components and functions are optional and may be combined or subdivided, and operations may vary in sequence or be combined or subdivided. In the following description, numerous specific details are set forth to provide a thorough understanding of examples. However, it will be evident to one skilled in the art that the present subject matter may be practiced without these specific details.

Drowsiness detection is used to prevent accidents caused by micro-sleep, fatigue, and lack of attention while driving. Advanced Driver Assistance Systems (ADAS) are designed to make driving safer and reduce the chances of human error leading to severe accidents. A drowsiness detection system analyzes various factors, such as erratic movements, speed, time of day, and weather conditions, to calculate the driver's tiredness index. When the system detects that the driver is not alert, the system alerts the driver (e.g., audible noise) to prevent the driver from losing focus while driving.

The Drowsy Driving Detection (D3) system provides a new safety feature that enhances road safety. The system integrates movement-associated events, capturing subtle nuances that might indicate drowsiness or distraction, and additionally performs in-depth facial expression analysis, providing a comprehensive assessment of the state of a driver based on video captures.

Techniques are presented for detecting when a driver of a vehicle is exhibiting signs or symptoms indicative of driving in an impaired state, including drowsiness. In some implementations, a drowsiness model is trained with data associated with inward videos and outward videos captured during a trip. The inward videos capture the inside of the cabin with the driver, and the outward videos capture the view in front of the vehicle in the direction of travel. Further, a device at the vehicle periodically calculates a drowsiness scale index value that indicates the level of drowsiness of the driver. Calculating the drowsiness scale index value includes obtaining a set of inward frames from the inward videos; for each inward frame, creating a face image by cropping the inward frame; obtaining a set of outward frames from the outward videos; calculating inward embeddings of the face images and outward embeddings of the outward frames; and calculating, by the drowsiness model, the drowsiness scale index value. According to certain examples, an "embedding" is a transformation of raw data into a lower-dimensional space that captures the significant characteristics of the original data in a form that is more manageable for analysis and processing. For example, in the context of machine learning, embeddings are used to convert complex and high-dimensional data such as images, text, or sensor readings into a dense vector of real numbers. This vector representation allows different types of data to be embedded in a common space where their relationships can be examined and utilized by algorithms.

For example, in some examples, the embedding comprises a vector that represents key features (e.g., facial features) extracted from an image, such as the position of the eyes or the contour of the mouth. These embeddings enable the system to compare and analyze facial images efficiently, despite the high dimensionality of the original pixel data. Embeddings are particularly valuable because they can reduce the computational complexity of machine learning models, improve performance by focusing on relevant features, and facilitate operations such as similarity comparisons, clustering, and classification.

FIG. 1 shows a system 100 for vehicle rider behavioral monitoring, according to some examples. As shown, multiple devices (e.g., vehicle 102, client device 104, and behavioral monitoring system 106) are connected to a communication network 108 and configured to communicate with each other through the communication network 108. The communication network 108 is any type of network, including a local area network (LAN), such as an intranet, a wide area network (WAN), such as the internet, a mobile telephone network, a satellite communications network, or any combination thereof. The communication network 108 is implemented using any number of communication links associated with one or more service providers, including one or more wired communication links, one or more wireless communication links, or any combination thereof.

The vehicle 102 may be any type of vehicle, or combination vehicle, such as an automobile, semi-trailer truck, trailer, plane, train, ship, and the like. Further, the techniques presented herein may be used with other non-moving assets that are operated by an operator (e.g., cranes, manufacturing equipment, call centers), and assets that are controlled remotely (e.g., drones, air-traffic controllers). The examples described herein should therefore not be interpreted to be exclusive or limiting, but rather illustrative.

As shown, the vehicle 102 includes an asset monitoring system (AMS) 110 that allows for monitoring events at the vehicle as well as exchanging information and commands between the vehicle 102 and one or more remote computing devices via the communication network 108.

The asset monitoring system 110 may include one or more hardware devices to perform monitoring functions at the vehicle. In some examples, the AMS 110 includes a communications device that is a hardware device that acts as a network access point for the AMS 110. For example, the communications device can be established as an edge device of a network or system of nodes within the vehicle 102.

The AMS may include a variety of sensors, computing devices (e.g., electronic control units (ECUs), actuators, etc., deployed within the vehicle. The communications device in the AMS facilitates wireless communication capabilities by connecting to wireless networks (e.g., cellular, wireless local area network, satellite communication networks, etc.) for purposes of communicating with remote computing devices. The communications device may also provide additional functionality, such as firewall functionality to filter inbound and outbound communications, disallow incoming communications from suspicious or unauthorized sources, etc.

The asset monitoring system 110 allows the vehicle 102 to transmit data, such as sensor data gathered by sensors in the vehicle 102, to a remote computing device. The vehicle 102 may be equipped with a variety of sensors that capture data describing the performance of the vehicle 102, actions performed by riders in and around the vehicle 102, and the vehicle's surrounding environment.

The behavioral monitoring system 106 is a computing system consisting of one or more computing devices configured to provide remote behavioral monitoring of a vehicle 102 to detect different conditions of driver state and execute corresponding responses. For example, the behavioral monitoring system 106 may allow a user, such as a fleet manager administrator, to define a set of triggering conditions and criteria for detecting and responding to undesirable behavior or dangerous conditions.

To utilize the functionality of the behavioral monitoring system 106, users (e.g., administrators and fleet managers) may use the client device 104. Although the shown system 100 includes only one client device 104 and one vehicle 102, this is only for ease of explanation and is not meant to be limiting. One skilled in the art would appreciate that the system 100 can include any number of client devices 104 and vehicles 102. Further, the behavioral monitoring system 106 may concurrently accept communications from and initiate communication messages and interact with any number of client devices 104 and vehicles 102, and support connections from a variety of different types of client devices 104.

A user may interact with the behavioral monitoring system 106 via a client-side application installed on the client device 104. In some embodiments, the client-side application includes a component specific to the behavioral monitoring system 106. For example, the component may be a stand-alone application, one or more application plug-ins, or a browser extension. However, the users may also interact with the behavioral monitoring system 106 via a third-party application, such as a web browser or messaging application, that resides on the client device 104 and is configured to communicate with the behavioral monitoring system 106. In either case, the client-side application presents a user interface (UI) for the user to interact with the behavioral monitoring system 106.

The behavioral monitoring system 106 may provide a user interface that allows administrators to configure the triggering conditions. Each triggering condition defines one or more individual conditions that, if satisfied, indicates the occurrence of an undesirable behavior or a critical event such as a collision. For example, a triggering condition may define one or more terms or a string of terms that, if spoken, indicate the use of offensive, derogatory, and otherwise undesirable language. As another example, a triggering condition may define physical motions and motion thresholds that, if performed, indicate violent, dangerous, and otherwise undesirable movements.

Each triggering condition may also be associated with a corresponding set of response actions to be performed by the behavioral monitoring system 106 if the triggering condition has been satisfied. For example, the response actions may include notifying the driver of a dangerous condition (e.g., drowsy driving), transmitting alerts to specified users/user devices, generating incident reports based on corresponding triggering conditions, modifying the mode of operation of sensors or the vehicle, and the like.

The user interface also enables the administrators to define corresponding actions to be performed in the event that a triggering condition has been satisfied/triggered. For example, the user interface enables the administrator to define contact identifiers (e.g., email addresses, phone numbers, etc.) to which notifications are to be sent. Similarly, the user interface enables the administrator to define actions for generating an incident report based on the detected occurrence of undesirable behavior. For example, the user interface enables the administrator to define a modified mode of operation of the sensors in the vehicle 102 to be initiated to capture additional data for inclusion in the incident report. This may include increasing the number of sensors used to capture data, such as by initiating the use of video cameras or microphones, increasing the performance of the sensors that are in use, such as by increasing the resolution used to capture video, and modifying the positioning of the sensors, such as by changing the angle or view of a camera to capture better the detected undesirable action.

Figure 2:
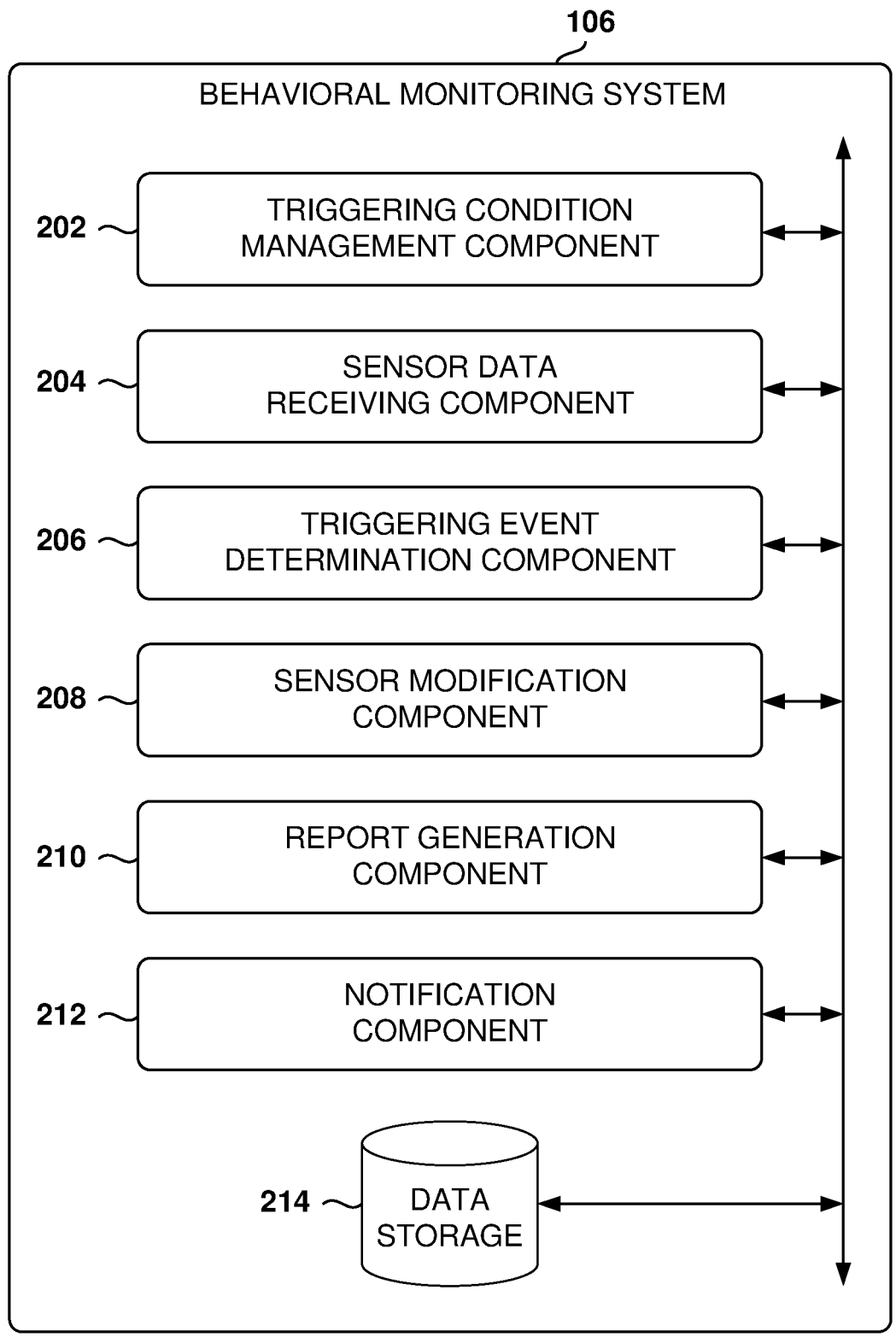
FIG. 2 is a block diagram of a Behavioral Monitoring System (BMS), according to some examples.

FIG. 2 is a block diagram of a behavioral monitoring system 106 (BMS), according to some examples. To avoid obscuring the inventive subject matter with unnecessary detail, various functional components (e.g., modules) that are not germane to conveying an understanding of the inventive subject matter have been omitted from FIG. 2. The various functional components depicted in FIG. 2 may reside on a single computing device or may be distributed across several computing devices in various arrangements, such as those used in cloud-based architectures.

The behavioral monitoring system 106 includes a triggering condition management component 202, a sensor data receiving component 204, a triggering event determination component 206, a sensor modification component 208, a report-generation component 210, a notification component 212, and a data storage 214.

The triggering condition management component 202 facilitates the generation and modification of triggering conditions. For example, triggering condition management component 202 provides a graphical user interface that allows administrators to generate and modify triggering conditions. Each triggering condition defines one or more individual conditions that, if satisfied, indicates the occurrence of an undesirable behavior, as well as a corresponding set of response actions to be performed if the triggering condition has been satisfied. The user interface provided by the triggering condition management component 202 enables administrators to define the triggering conditions. Triggering conditions may include any one or combination of specific criteria or parameters that, when met or surpassed, prompts a predetermined or user defined response within the system. For example, such conditions can include: thresholds; the detection of image features from camera feeds; anomalies in sensor data, such as irregular steering or braking patterns; behavioral patterns, including for example a lack of interaction with vehicle controls or infrequent checks of mirrors; as well as the presence of certain environmental factors like the time of day, adverse weather conditions, or high traffic density.

Similarly, an administrator may use the user interface elements to define corresponding actions to be performed in the event that a triggering condition has been triggered. In some examples, the triggering condition management component 202 stores the generated triggering conditions in the data storage 214. The stored triggering conditions may be associated with an account and fleet identifier that identifies the account, vehicle fleet, or vehicles to which the triggering conditions are associated.

The sensor data receiving component 204 receives sensor data from the vehicles 102, including data from the sensors in the AMS 110. The sensor data receiving component 204 provides the sensor data to the other components of the behavioral monitoring system 106 for use in detecting the occurrence of undesirable behavior. The sensor data receiving component 204 may also store the sensor data in the data storage 214, where it may be accessed by the other components of the behavioral monitoring system 106. For example, the stored sensor data may be associated with a unique identifier associated with the vehicle 102 from which the sensor data was received. The sensor data may also include timestamp data indicating the time at which the sensor data was captured by the sensors of the vehicle 102 or when the sensor data was received by the behavioral monitoring system 106.

The triggering event determination component 206 uses the sensor data received by the sensor data receiving component 204 to determine whether any of the triggering conditions have been satisfied. In some embodiments, a triggering condition may be based on a combination of individual conditions, such as a combination of detecting specified terms, detecting specified motions, or detecting a specified volume level. In these types of embodiments, the triggering event determination component 206 may use the sensor data to determine that each of the individual conditions has been satisfied within a predetermined time window, such as within a five-second window. For example, the triggering event determination component 206 may use timestamp data associated with the sensor data to determine whether each of the individual conditions was satisfied within the predetermined time window. Accordingly, the triggering condition is satisfied when each of the individual conditions occurs within the predetermined time window.

The triggering event determination component 206 notifies the other components of the behavioral monitoring system 106 if a triggering condition has been triggered.

The sensor modification component 208 causes a modification to an operating mode of sensors in the vehicle 102. In some cases, an administrator or fleet manager may with wish to capture additional or higher-quality sensor data to document a detected incident of undesirable behavior. For example, the administrator or fleet manager may wish to initiate the use of sensors, such as cameras, microphones, and the like, to capture sensor data and document the incident.

The report-generation component 210 generates an incident report to document a detected occurrence of undesirable behavior. The incident report may include any of a variety of data defined by an administrator in a triggering condition. For example, an incident report may include data identifying the vehicle 102, the time of the incident, the action that satisfied the triggering condition (e.g., detected terms, action, etc.), as well as captured sensor data depicting the incident. The report-generation component 210 may store the incident report in the data storage 214, where an administrator or other authorized user may access it.

The notification component 212 generates and transmits a notification to users defined by the triggering condition. For example, the notification component 212 identifies a contact identifier corresponding to the triggering event. The contact identifier may be defined by an administrator when generating the triggering event. The contact identifier provides contact details for reaching a user designated to receive a notification when the triggering event is triggered. For example, the contact identifier may be an email address, phone number, and the like.

The notification component 212 may then transmit a notification directed to the content identifier. The notification may provide details of the detected incident, such as a description of the undesirable behavior, time, associated vehicle 102, and the like. The notification may also enable a user to access an incident report associated with the detected incident.

Figure 3:
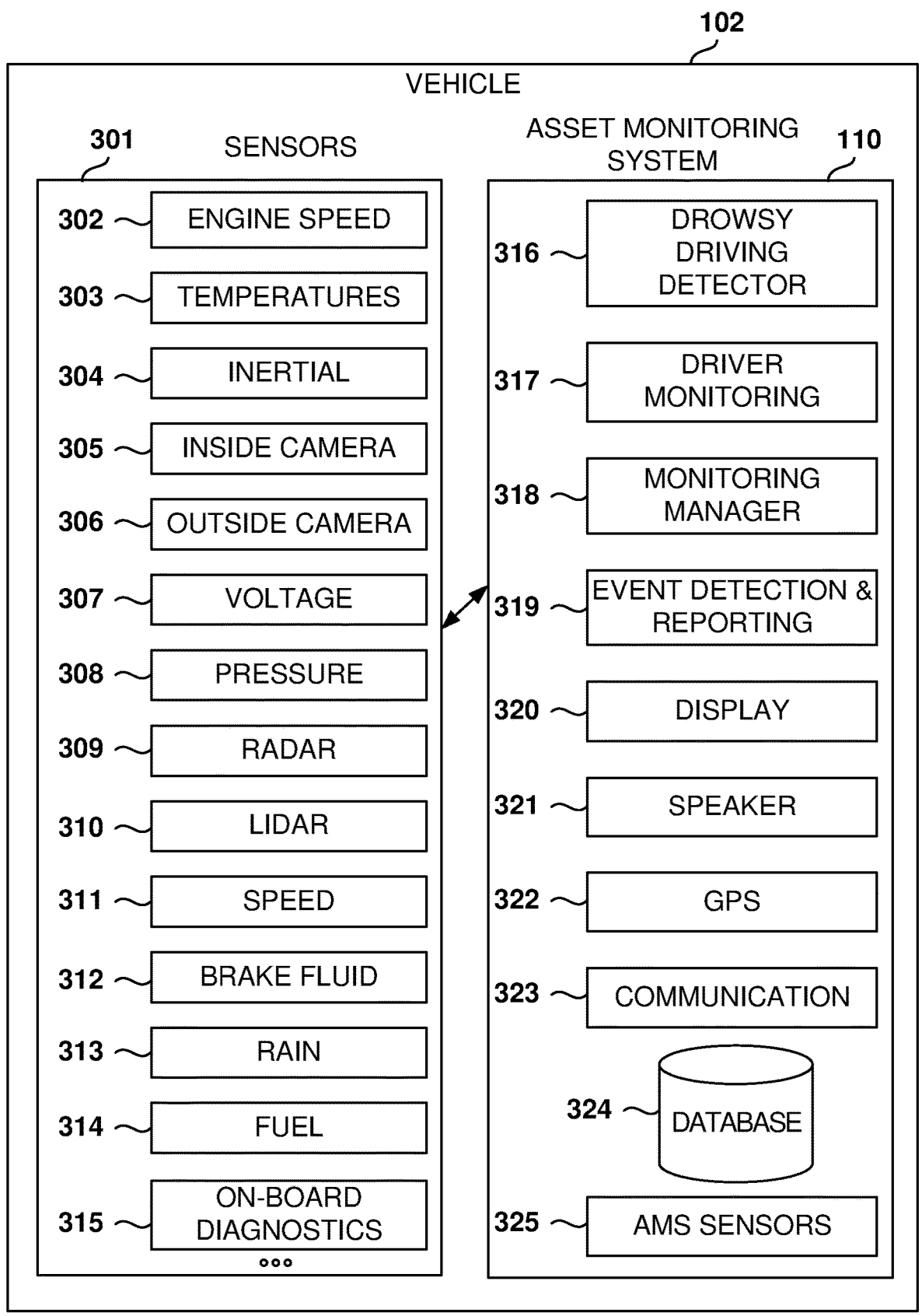
FIG. 3 illustrates the components of a vehicle for rider behavioral monitoring, according to some examples.

FIG. 3 illustrates components of a vehicle 102 for rider behavioral monitoring, according to some examples. The vehicle 102 includes an asset monitoring system 110 and a plurality of sensors 301. The AMS 110 may include a single device or distribute its functions across a plurality of devices in the vehicle (e.g., sensors, processors, communications device) that are able to communicate among themselves.

In one example configuration, the AMS 110 includes a first device and a second device. The first device includes the communications device 323 that provides communication services within the vehicle and the network. The first device may be connected to the diagnostic port in the vehicle to gather vehicle information. The second device includes one or more processors, computer memory, inward and outward cameras, a microphone, and a speaker. In some examples, the second device is configured to execute machine learning models described below, but other examples may execute the machine learning models in the first device. Other configurations may include additional devices within the AMS 110 or consolidate all functions within a single device.

The sensors 301 are configured to monitor various parameters and states of the vehicle. In some examples, the sensors 301 include an engine speed sensor 302 that measures the revolutions per minute of the engine, temperature sensors 303 that measure various temperature points in the vehicle (e.g., cabin, engine, outside), and inertial sensors 304 that detect motion and orientation of the vehicle.

The inside camera 305 is installed within the vehicle cabin to monitor the driver and passengers, while the outside camera 306 provides visual information about the environment surrounding the vehicle. A voltage sensor 307 monitors the electrical system of the vehicle, and pressure sensors 308 detect the pressure in various systems such as tires or hydraulic systems. Radar sensors 309 and Light Detection and Ranging (LIDAR) sensors 310 provide distance and mapping capabilities for the vehicle's surroundings. A speed sensor 311 measures the traveling speed of the vehicle, and a brake fluid sensor 312 monitors the level and condition of the brake fluid. Rain sensors 313 detect precipitation on the vehicle, and fuel sensors 314 monitor the amount of fuel in the tank. The vehicle also includes an on-board diagnostics system 315 for self-diagnosis and reporting of the operational status of the vehicle 102.

The AMS 110 is configured to communicate with the sensors 301 and includes several components. A drowsy driving detector 316 analyzes data to determine if the driver exhibits signs of drowsiness. A driver monitoring system 317 continuously assesses the state of the driver and the behavior of the driver for a plurality of conditions. The monitoring manager 318 oversees the communication between the sensors 301 of the vehicle and the asset monitoring system. An event detection and reporting system 319 is configured to identify and log significant events based on sensor data. A display 320 provides visual feedback and information to the vehicle occupants, while a speaker 321 provides auditory information or alerts. A GPS module 322 offers navigation and location-tracking capabilities. A communications device 323 facilitates communication with external networks, and a database 324 stores data collected from the sensors 301 of the vehicle and subsystems for analysis and record-keeping.

Further, the AMS may include AMS sensors 325, such as any of the sensors 301. In some examples, the AMS sensors 325 include an inside camera, an outside camera, and a microphone, but other examples may include additional sensors.

Figure 4:
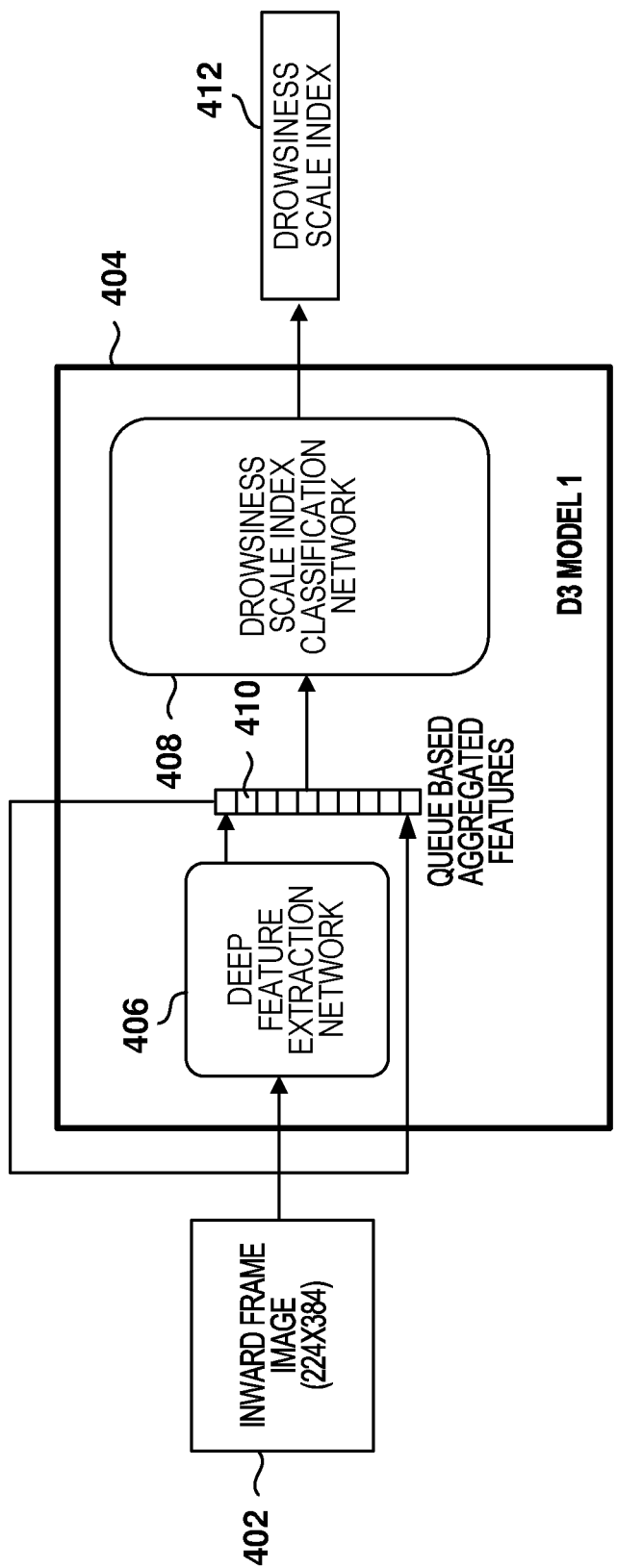
FIG. 4 shows an architecture for architecture for drowsiness detection, according to some examples.

FIG. 4 shows an architecture for architecture for drowsiness detection, according to some examples. The D3 system for drowsiness detection utilizes external sensors to monitor the position of the vehicle within the lane and the detection of driver's eye blink patterns.

Several distinctive characteristics differentiate a drowsiness event from other safety events. Typically, drowsiness escalates progressively throughout a journey as time goes by. The likelihood of a driver experiencing drowsiness is heightened with the extension of the driving period.

Drowsiness typically manifests through a variety of indicators that accumulate progressively as the operator experiences increasing fatigue. This phenomenon presents three implications for the product in question. Firstly, the artificial intelligence model must be capable of detecting a multitude of behaviors rather than a singular behavior. Secondly, the manifestations of drowsiness may vary; certain instances may include a combination of yawning and eye rubbing, while others may solely involve the closing of the operator's eyes. Thirdly, data from the Inertial Measurement Unit (IMU), specifically reaction time, in conjunction with forward-facing video footage assessing lane maintenance, may also act as indicators of drowsiness.

Consequently, the artificial intelligence model must evaluate operator behavior over an extended period, in contrast to other events such as Inattentive Driving, Mobile Usage, and Following Distance, which are identified based on incidents lasting from a few seconds to a maximum of one minute.

Figure 6:
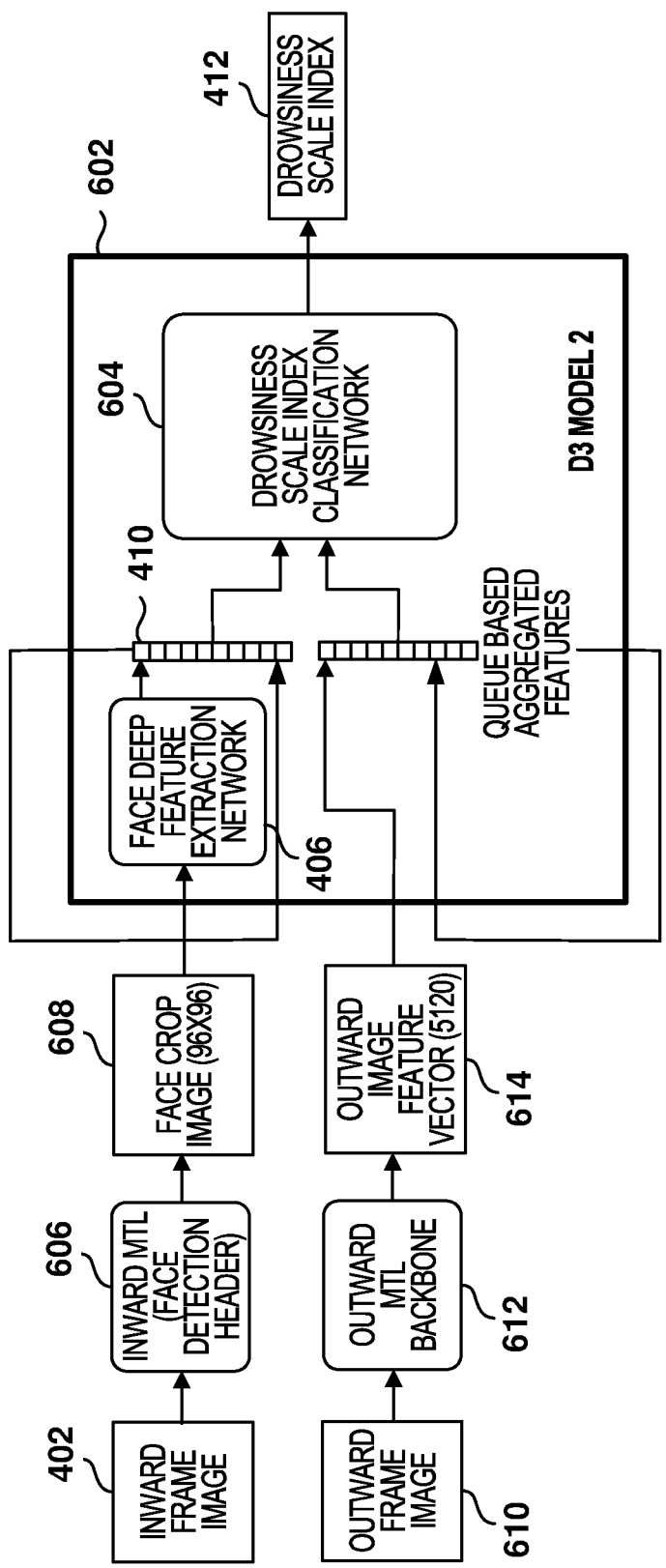
FIG. 6 shows an architecture for architecture for drowsiness detection based on inward and outward images, according to some examples.
Figure 8:
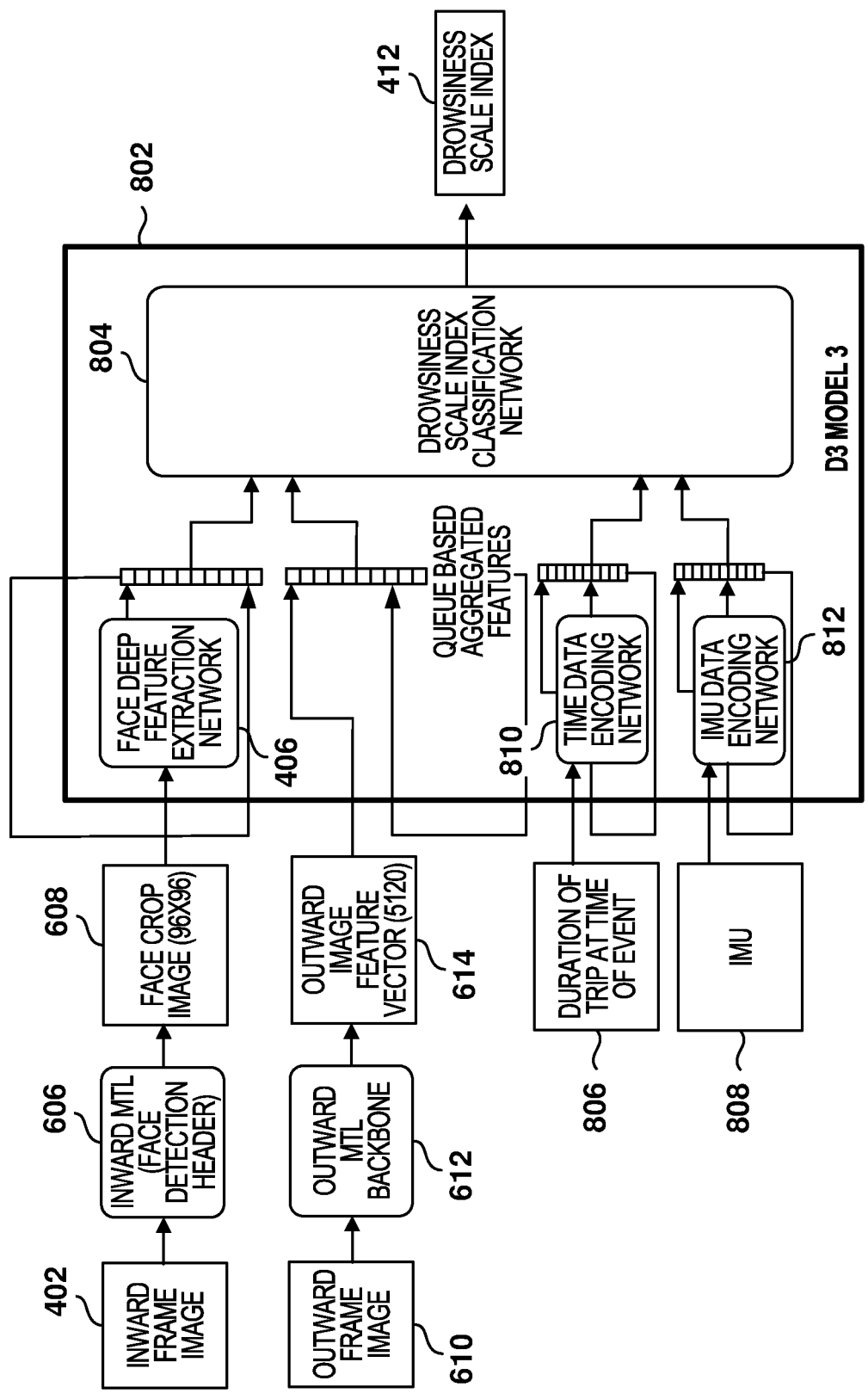
FIG. 8 shows an architecture for architecture for drowsiness detection based on inward images, outward images, trip duration, and inertial measurements, according to some examples.

Three different D3 models are presented with reference to FIGS. 4, 6, and 8, each D3 model having a different level of complexity. In some examples, the D3 models are executed by a processor at a monitoring device installed in the vehicle that includes one or more processors, memory, an inward camera, an outward camera, and a speaker, but other examples may include executing the D3 models at other device from the AMS. The embodiments illustrated in FIGS. 4, 6, and 8 should therefore not be interpreted to be exclusive or limiting, but rather illustrative.

FIG. 4 illustrates the user of the D3 model 1 404, which is based on image recognition. The D3 model 1 404 includes a deep feature extraction network 406 that generates feature embeddings 410 for the inward images 402 of the driver captured by the inside camera in the vehicle cabin. The feature embeddings 410 are used as inputs to a drowsiness classifier 408, also referred to herein as drowsiness scale index classification network. The drowsiness classifier 408 then outputs a value indicative of the drowsiness state of the driver.

In some examples, the output is a drowsiness scale index 412 is a value in the Observer Rating of Drowsiness (ORD)

protocol, which provides a drowsiness scale with values from one through five, defined as follows: not drowsy (1), slightly drowsy (2), moderately drowsy (3), very drowsy (4), and extremely drowsy (5).

In other examples, other drowsiness scales may be used, such as the Karolinska Sleeping Scale (KSS), a standard measure of fatigue, which is the mandated fatigue scoring methodology for EU Regulation 2019/2144. The KSS provides nine different values for measuring drowsiness. The values are: extremely alert 1; very alert 2; alert 3; fairly alert 4; neither alert nor sleepy 5; some signs of sleepiness 6; sleepy but no effort to keep alert 7; sleepy with some effort to keep alert 8; and very sleepy with great effort to keep alert 9.

In some examples, a condensed version of the KSS scales is used, including: very alert 1 (combines KSS levels 1-3); fairly alert 2 (KSS level 4); some signs of sleepiness 3 (KSS levels 5-7); sleepy 4 (KSS level 8); and very sleepy 5 (KSS level 9).

In another example, a new scale based on KSS is used, including: drowsy 1 (KSS levels 1-3) exhibits alertness through normal facial tone, fast eye blinks, short glances, and occasional body gestures; slightly drowsy 2 (KSS levels 4-5) less sharp appearance, slightly longer glances, slower eye blinks, but still sufficiently alert for driving; moderately drowsy 3 (KSS levels 6-7) displays mannerisms like rubbing face or eyes, restlessness, facial contortions as countermeasures to drowsiness, or may appear subdued with slower eyelid closures and a glassy-eyed stare; very drowsy 4 (KSS levels 8-9) exhibits eyelid closures of 2 to 3 seconds, eye-rolling, improper eye focusing, decreased facial tone, and large isolated movements like significant steering corrections; and extremely drowsy 5, (new level to denote a more severe level of sleepiness outlined in the KSS) near sleeping with eyelid closures of 4 seconds or more, prolonged inactivity, and large punctuated movements during transitions in and out of dozing intervals.

More details regarding the operation of deep feature extraction network 406 and drowsiness classifier 408 are provided below with reference to FIG. 6.

One aspect of novelty in the presented solution is that the D3 model 1 404 approach lies in the direct interpretation of videos into numerical data, as opposed to relying on fine-grained features such as eye-aspect PERCLOS ratio, yawning frequency, and head pose, which are sensitive to noise and prone to errors in low contrast images. This novel technique addresses the limitations of existing methods when dealing with low-contrast images, such as those captured by dash cam cameras.

Figure 5:
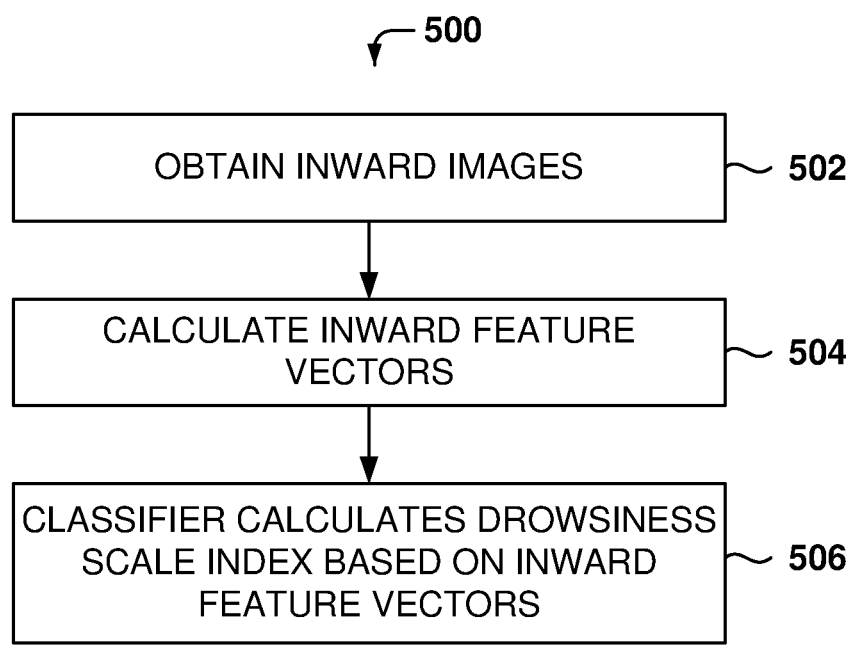
FIG. 5 is a flowchart of a method for drowsiness detection based on inward images, according to some examples.

FIG. 5 is a flowchart of method 500 for drowsiness detection based on inward images, according to some examples. While the various operations in this flowchart are presented and described sequentially, one of ordinary skill will appreciate that some or all of the operations may be executed in a different order, be combined or omitted, or be executed in parallel.

Operation 502 is for obtaining inward images, that is, images from the inward camera in the vehicle, which is the camera that captures images of the cabin, including the driver of the vehicle.

From operation 502, method 500 flows to operation 504 for calculating inward feature vectors for each frame captured by the inward camera.

From operation 504, method 500 flows to operation 506 to calculate, by the drowsiness classifier 408, the drowsiness scale index based on the inward feature vectors. In some examples, the ten most recent inward feature vectors are used as inputs to the drowsiness classifier 408. Still, other examples may use a different number of the most recent inward feature vectors (e.g., in the range from one to fifty or more).

FIG. 6 shows an architecture for architecture for drowsiness detection based on inward and outward images, according to some examples. The accuracy of detecting drowsiness driving can be enhanced by combining insights from both the inward-facing camera (monitoring the driver) and the outward-facing camera (tracking the movement of the vehicle).

The solution includes a fatigue prediction model for drivers, called D3 model 2 602, that is trained using a large dataset of fatigued driver images and is designed to predict drowsiness without relying on individual drivers. The D3 model 2 602 utilizes both outward and inward camera footage to comprehensively evaluate the driver and the position of the vehicle within the lane.

Prior research has concentrated on the eye-closure ratio or the mouth aspect ratio, which largely relies on the precision of facial landmark detection, which is used to compute an eye-closure ratio and a mouth aspect ratio through the application of facial landmark detection techniques. However, when the inward camera has very low contrast, especially at night, it is difficult to get exact accurate facial landmarks to calculate these ratios.

The presented solution does not rely on determining facial features, and instead, it translates directly from inward and outward images to the value in the drowsiness scale index 412.

In some examples, a simple, reliable method is used to label training data to provide a drowsiness drawing assessment based on short videos. Current solutions require assessing a complex set of rules on a large amount of data, so the labeling process is quite expensive.

However, in some examples, short videos collected from vehicles are used for training. Each video is short (e.g., ten seconds), and the annotator then determines a value in the drowsiness scale index 412, which is a fast process. Further, the data from user reviews may be used for training. Often, the users of BMS review videos of possible incidents and make annotations for each video, or sometimes discard the videos because no incident was detected. This data may be used to tag the videos and the tagged videos are used to train the D3 model 2 602.

In some examples, for a comprehensive analysis of intricate facial expressions, the inward images 402 are cropped to identify signs of driver drowsiness. The inward images 402 are processed by an inward Multi-Task Learning (MTL) model that detects faces in an inward frame. Multi-task learning is a paradigm where a model is trained to perform multiple related tasks simultaneously, leveraging the commonalities and relationships between tasks to improve the overall performance of each task. In MTL, a single model is trained on a dataset that contains examples of multiple tasks. During training, the model learns to optimize across all tasks, sharing information between them jointly. This sharing of information can lead to improved generalization, especially when the tasks have some underlying relationships or dependencies.

The output of the inward MTL 606 is a face crop image 608 that includes the face of the driver after eliminating the background from the inward image 402. Because the face crop image 608 processes a significantly smaller image than the original (e.g., the face crop image measures 96×96 compared to the full frame's dimensions of 244×216), it is possible to perform the D3 analysis on smaller devices that may have constraints in terms of storage and processing capabilities, ensuring efficiency without compromising on performance.

Thus, the D3 model 2 602 translates video frames directly to a drowsiness scale index 412. The addition of an outward camera assists in resolving situations where accuracy may be low from just the inward frames, such as when the driver is looking at a mobile phone, looking down to read a map or a document, or squinting because of the sun in front. The correlation between the information from the outward and inward cameras provides stronger evidence of driver drowsiness, particularly through the detection of lane wandering that may be determined based on the outward frame images 610.

In some examples, the outward frame images 610 are not annotated for training. The outward frame images 610 are fed into an outward MTL backbone 612 that generates an outward image feature vector 614. That is, the outward frame images 610 are not cropped as the inward images 402. The deep feature extraction network 406 takes each face crop image 608 and generates the feature embedding 410 for the face crop image.

The D3 model 2 602 includes the deep feature extraction network 406 and a drowsiness classifier 604, also referred to as the drowsiness scale index classification network.

The drowsiness classifier 604 receives as inputs a plurality of feature embeddings 410 and a plurality of outward image feature vector 614. In some examples, ten vectors of each mode are used as inputs, but other examples may utilize a different number of vectors. As time goes by, the vectors are cycled out, which means that when a new vector is available, the oldest vector is eliminated from the buffer of inputs.

In some examples, sampling is used to select inward and outward frames. For example, one frame is used for each half a second, although other sampling rates may be utilized. In some examples, ten-second windows are used for the analysis, which correspond to 20 image feature vectors when using a sampling rate of two frames per second.

The drowsiness classifier 604 then generates the drowsiness scale index 412 based on the input vectors. The drowsiness scale index 412 will change over time at a certain frequency based on how frequently the inputs change. For example, the drowsiness scale index 412 may be recalculated every half second, but other calculation frequencies for calculating the drowsiness scale index 412 may be used.

In some examples, the drowsiness classifier 604 is a ResNet (Residual Network) model, which is a type of convolutional neural network (CNN) architecture. The ResNet uses the concept of residual learning, which addresses the degradation problem that occurs when deeper neural networks are unable to achieve better accuracy despite having more layers. ResNet addresses this problem by introducing skip connections, also known as identity mappings or shortcuts, which allow the model to learn residual functions with respect to the layer inputs. These skip connections bypass one or more layers, allowing the network to learn the residual mapping instead of the full mapping. This makes it easier to train very deep networks by alleviating the vanishing gradient problem, as the gradient can flow directly through the skip connections, enabling the network to learn both shallow and deep features effectively.

The architecture of a typical ResNet consists of a series of residual blocks, each containing multiple convolutional layers, batch normalization, and activation functions. These residual blocks are stacked together, forming the backbone of the network.

Figure 7:
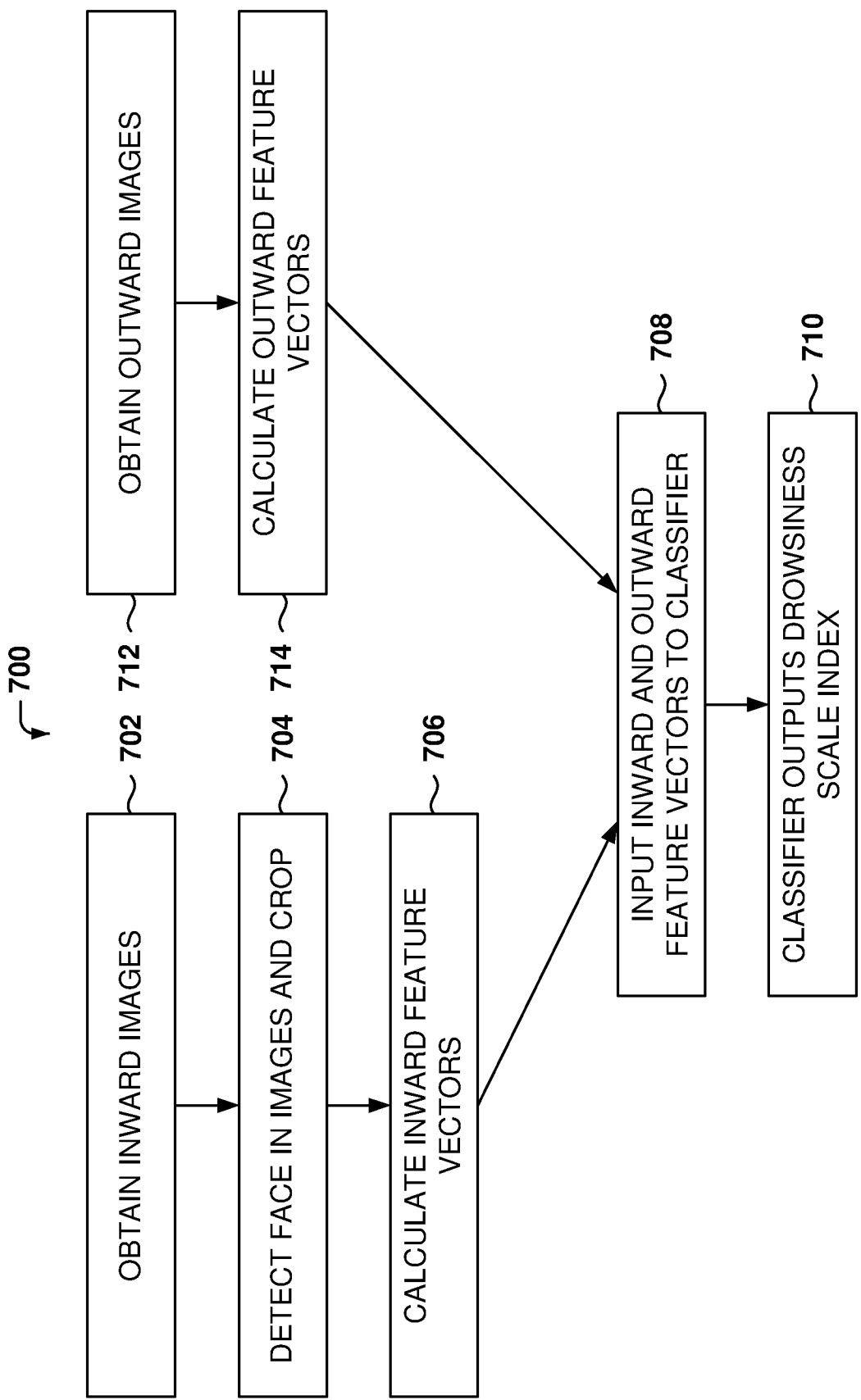
FIG. 7 is a flowchart of a method for drowsiness detection based on inward and outward images, according to some examples.

FIG. 7 is a flowchart of method 700 for drowsiness detection based on inward and outward images, according to some examples. While the various operations in this flowchart are presented and described sequentially, one of ordinary skill will appreciate that some or all of the operations may be executed in a different order, be combined or omitted, or be executed in parallel.

At operation 702, inward images are obtained. In some examples, as depicted at operation 712, outward images are obtained concurrently.

From operation 702, method 700 flows to operation 704, where faces are detected within the images and subsequently cropped. In parallel, at operation 714, feature vectors for the outward images are calculated.

From operation 704, method 700 flows to operation 706, where inward feature vectors are calculated based on the cropped faces. Both the inward feature vectors from operation 706 and the outward feature vectors from operation 714 are then inputted into a classifier at operation 708.

The classifier, having received the inward and outward feature vectors, processes this data and outputs a drowsiness scale index at operation 710. This drowsiness scale index can be used to assess the level of alertness or fatigue of an individual, potentially providing valuable information for driver safety systems.

FIG. 8 shows an architecture for architecture for drowsiness detection based on inward images, outward images, trip duration, and inertial measurements, according to some examples. The D3 model 3 802 adds two new inputs to the D3 model 2 602: a duration of trip 806 at the time of the event and an inertial measurement 808 from the IMU (Inertial Measurement Unit).

The durations of trip 806 are used as input to a time-data encoding network 810 that generates a time embedding for each duration of trip 806 event. Similar to the image vectors described above, a plurality of time embeddings are used as input to the drowsiness classifier 804, and the time embeddings are discarded as time goes by, where the oldest time embedding is discarded subsequent to a new time embedding being created.

Further, the inertial measurements 808 are used as input to an IMU data encoding network 812 that generates an IMU embedding for each IMU measurement 808. Similar to the image vectors described above, a plurality of IMU embeddings are used as input to the drowsiness classifier 804, and the IMU embeddings are discarded as time goes by, where the oldest IMU embedding is discarded when a new IMU embedding is created.

The durations of the trips provide valuable information to determine drowsiness since drivers are more likely to become drowsy as the duration of the trip becomes greater.

The inertial measurements 808 also provide valuable information to determine drowsiness because when drivers are drowsy, it is more likely that the driver will generate more events like curving on the road or breaking rapidly.

Figure 9:
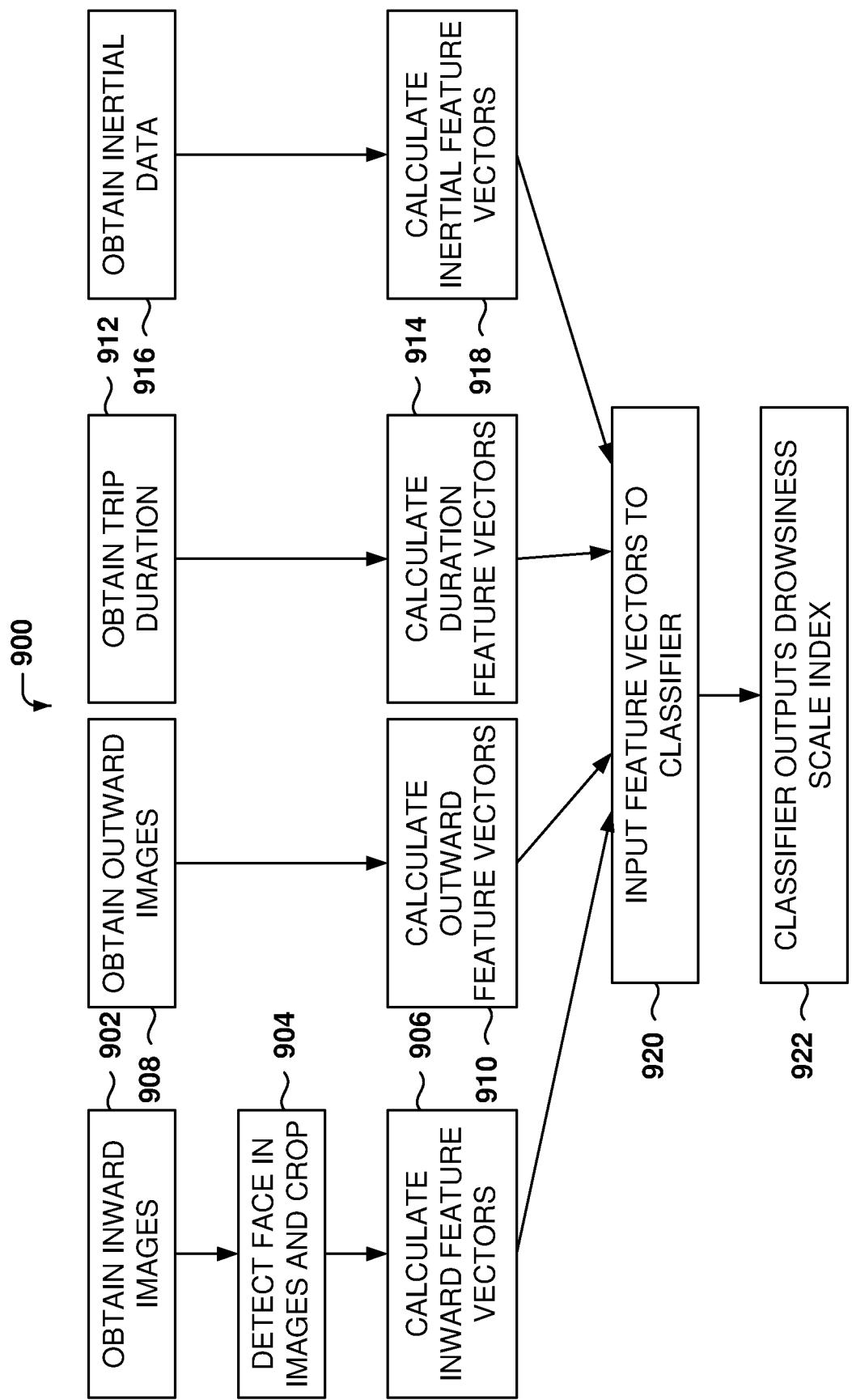
FIG. 9 is a flowchart of a method for drowsiness detection based on inward images, outward images, trip duration, and inertial measurements, according to some examples.

FIG. 9 is a flowchart of a method 900 for drowsiness detection based on inward images, outward images, trip duration, and inertial measurements, according to some examples. While the various operations in this flowchart are presented and described sequentially, one of ordinary skill will appreciate that some or all of the operations may be executed in a different order, be combined or omitted, or be executed in parallel.

At operation 902, the asset monitoring system 110 obtains inward images, which may be images captured by an inward-facing camera positioned to capture images of the driver.

Following the image acquisition, at operation 904, the asset monitoring system 110 detects the driver's face within the inward image and crops the image accordingly to focus on the facial features of the driver.

Subsequently, at operation 906, the asset monitoring system 110 calculates inward feature vectors based on the cropped inward images. These feature vectors may represent various facial characteristics or expressions that are indicative of the subject's level of alertness or drowsiness.

Concurrently, at operation 908, the asset monitoring system 110 obtains outward images, which could be images captured by an outward-facing camera that records the environment external to the vehicle, such as the road ahead.

At operation 910, the asset monitoring system 110 calculates outward feature vectors from the outward images. These feature vectors may include elements related to the driving environment or the subject's interaction with the environment that could be relevant to assessing the subject's state of alertness.

Additionally, at operation 912, the asset monitoring system 110 obtains trip duration data, which includes the duration of the trip until the current time. This data is used to calculate duration feature vectors at operation 914, which may provide context regarding the likelihood of fatigue based on the duration of the trip.

At operation 916, the asset monitoring system 110 obtains inertial data, which could include measurements from sensors that detect motion or orientation. The inertial data is used to calculate inertial feature vectors at operation 918.

At operation 920, the asset monitoring system 110 inputs the calculated feature vectors, including inward, outward, duration, and inertial feature vectors, into the classifier. The classifier is configured to analyze the feature vectors and determine the subject's level of drowsiness.

Finally, at operation 922, the classifier outputs a drowsiness scale index. This index quantifies the subject's level of drowsiness, which can be used to trigger alerts or take other actions to mitigate the risks associated with drowsy behavior.

Figure 10:
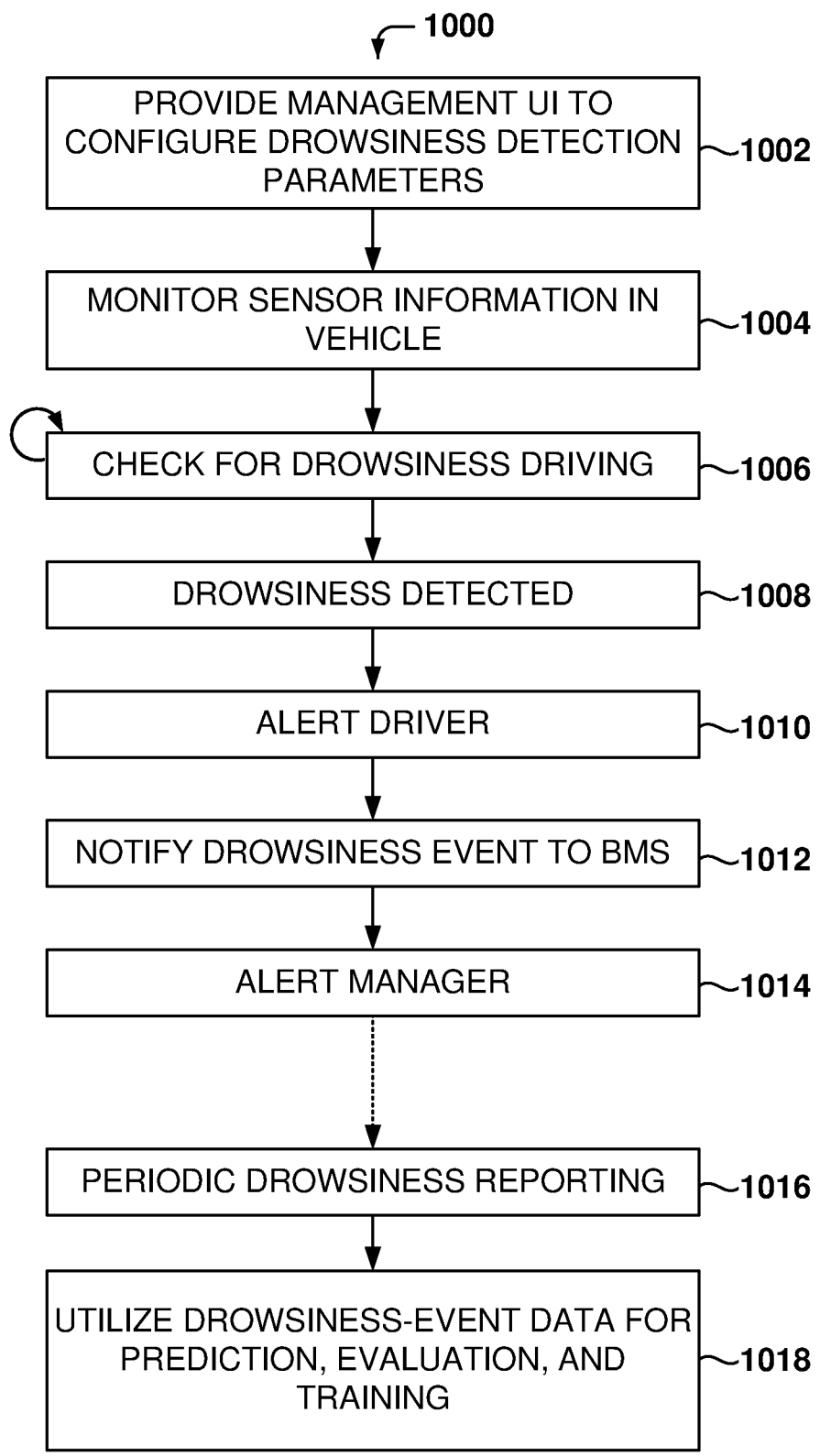
FIG. 10 is a flowchart of a method for the management of drowsiness on vehicles, according to some examples.

FIG. 10 is a flowchart of method 1000 for the management of drowsiness on vehicles, according to some examples. While the various operations in this flowchart are presented and described sequentially, one of ordinary skill will appreciate that some or all of the operations may be executed in a different order, be combined or omitted, or be executed in parallel.

The BMS identifies drowsiness in drivers who have been driving for extended periods. The BMS aims to provide proactive reporting and risk identification by analyzing driving data to determine the likelihood of drowsiness. This predictive analysis is then used to generate a risk score and provide proactive notifications to the driver or relevant parties.

At operation 1002, a management user interface (UI) is provided to configure drowsiness detection parameters. Following this configuration, method 1000 proceeds to operation 1004, where sensor information collected by one or more sensors associated with the vehicle are continuously monitored. These sensors may collect various types of data that could indicate driver drowsiness, such as steering patterns, eye movement, or head position.

From operation 1004, method 1000 flows to operation 1006, where the asset monitoring system 110 checks for drowsiness driving by analyzing the monitored sensor information to detect patterns or behaviors consistent with driver fatigue. Operation 1006 is periodically performed (e.g., twice per second).

If drowsiness is detected at operation 1008, method 1000 moves to operation 1010, where an alert is issued to the driver. This alert serves as an immediate warning to the driver, prompting them to take action to mitigate the risk of an accident due to drowsiness. Typically, when drivers are in their vehicles, they want to hear accurate and relevant in-cab alerts so they can avoid crashes and stay safe.

In some examples, the in-cab alerting system is designed to notify the driver as soon as the drowsiness scale threshold is surpassed. Once this threshold is breached, subsequent alerts will be issued at predefined intervals (e.g., every minute) as long as the driver remains above the specified limit.

In addition to alerting the driver, the asset monitoring system 110 also notifies a drowsiness event to the backend management system (BMS) at operation 1012. This notification can be used to log incidents, inform fleet management, or trigger additional protocols. Typically, when safety managers enable drowsiness detection for their fleet, they want the feature to trigger in all instances of drowsy driving so they can reduce crashes in their fleet.

The BMS, upon receiving the notification, may then alert a manager at operation 1014. When safety managers are alerted to a drowsy driver, they want to take immediate corrective action to ensure the driver is operating their vehicle safely. This alert ensures that appropriate personnel are informed about the drowsiness event and can take further action if necessary.

Method 1000 may also include periodic drowsiness reporting at operation 1016, which involves compiling and analyzing data over time to identify trends or recurring issues regarding drowsy driving. In some examples, the BMS analyzes drowsiness data captured over time to determine a drowsiness risk score (e.g., on a scale of one to ten) based on trip parameters. For example, the risk analysis may determine that drowsiness drastically increases after a driver has been continuously driving for four hours, driving for more than ten hours a day, driving at certain times of the day, etc.

With the risk score, the fleet manager is able to change driving routes and schedules, as well as train drivers to watch for risk parameters. Additionally, the drowsiness risk score may be calculated and presented in advance of each trip to give the administrator and the driver guidance on potential dangers.

At operation 1018, the drowsiness-event data is utilized for prediction, evaluation, and training. This operation involves using the collected data to improve the system's predictive capabilities, assess its effectiveness, and train drivers or the system itself to recognize better and respond to drowsiness.

When safety managers are evaluating their fleet, they want to understand trends of drowsy driving so they can take preventative action to reduce incidents involving drowsiness. Further, when safety managers are coaching their drivers, they want to partner with them to understand the root cause of drowsiness so they can reduce incidents involving drowsiness.

Overall, method 1000 provides a systematic approach to managing driver drowsiness through detection, alerting, reporting, and data utilization, with the aim of enhancing vehicle safety and driver well-being.

Figure 11:
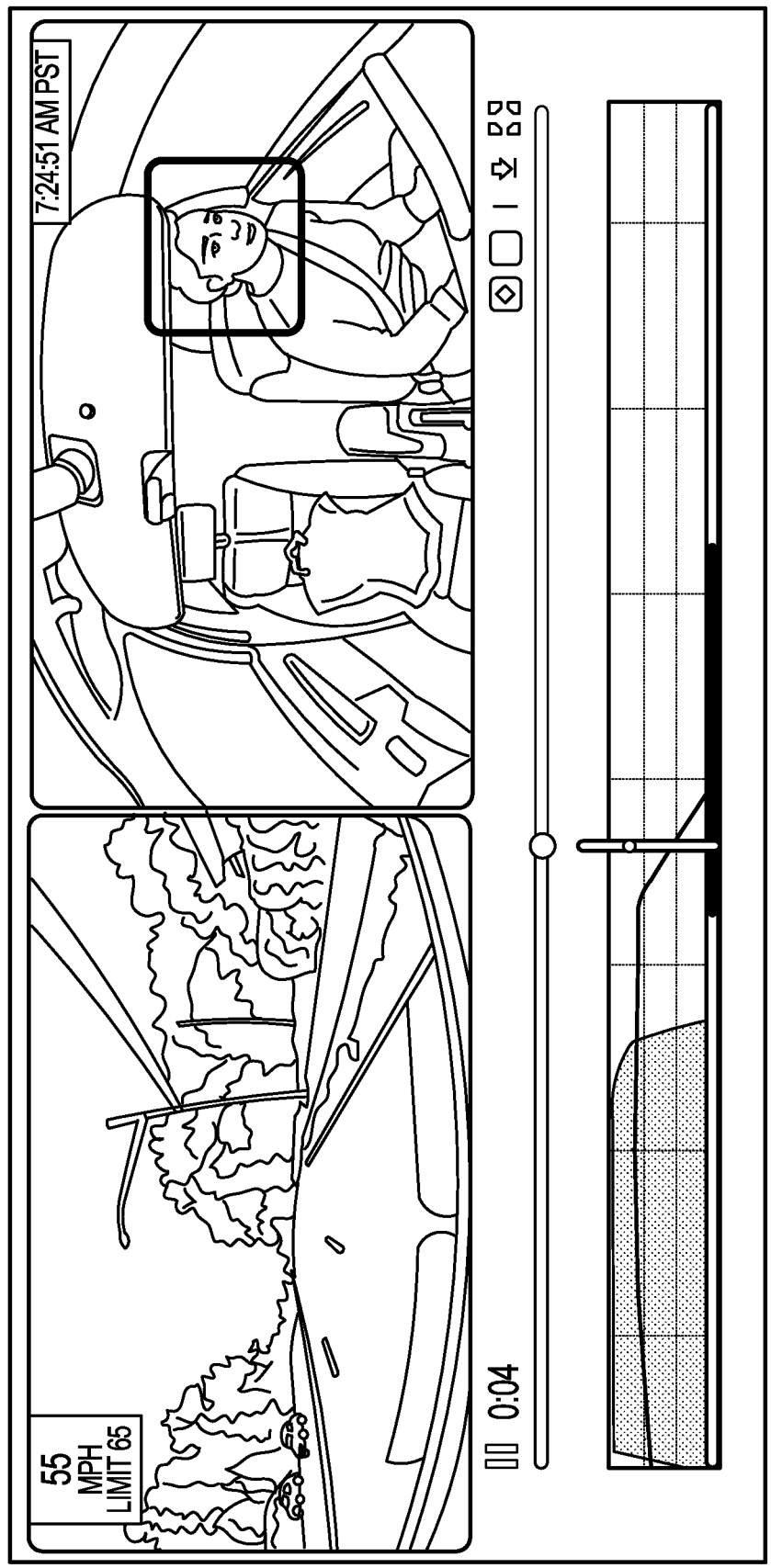
FIG. 11 shows a screen capture of a recording presented for a detected event of drowsy driving, according to some examples.

FIG. 11 shows a screen capture of a recording presented for a detected event of drowsy driving, according to some examples. For a comprehensive understanding of events, the BMS is able to display a ten-second video capturing the moments surrounding the instance when the drowsiness scale threshold was exceeded.

The inbox of the system administrator will show detected events and their categories, such as drowsy driving. If the user selects an event, the recording of the event will be shown as presented in FIG. 11.

The display is divided into multiple sections, providing various types of information to the user. The top left section of the display presents a forward-facing camera view, showing the road ahead from the perspective of the outward camera. This view includes an overlay indicating the vehicle's current speed and the speed limit for the area.

Adjacent to the forward-facing view on the top right section of the display is an inward camera view, which focuses on the driver of the vehicle. The driver's face is highlighted within a red outline, indicating that the system is actively monitoring the driver's face.

Below these camera views is a timeline-based graphical representation that spans the width of the display. This timeline shows a history of the vehicle's speed over a period, with a marker indicating the current point in time. The graphical representation may be used to track different events, such as drowsy driving, sudden breaks, tailgating, etc. In this example, the center ten seconds of footage show the time when the drowsiness detection threshold was exceeded.

The user interface also includes playback controls, which allow the user to pause, play, or navigate through the recorded footage. These controls are centrally located at the bottom of the display, providing easy access for reviewing specific events or time frames captured by the asset monitoring system 110.

Figure 12:
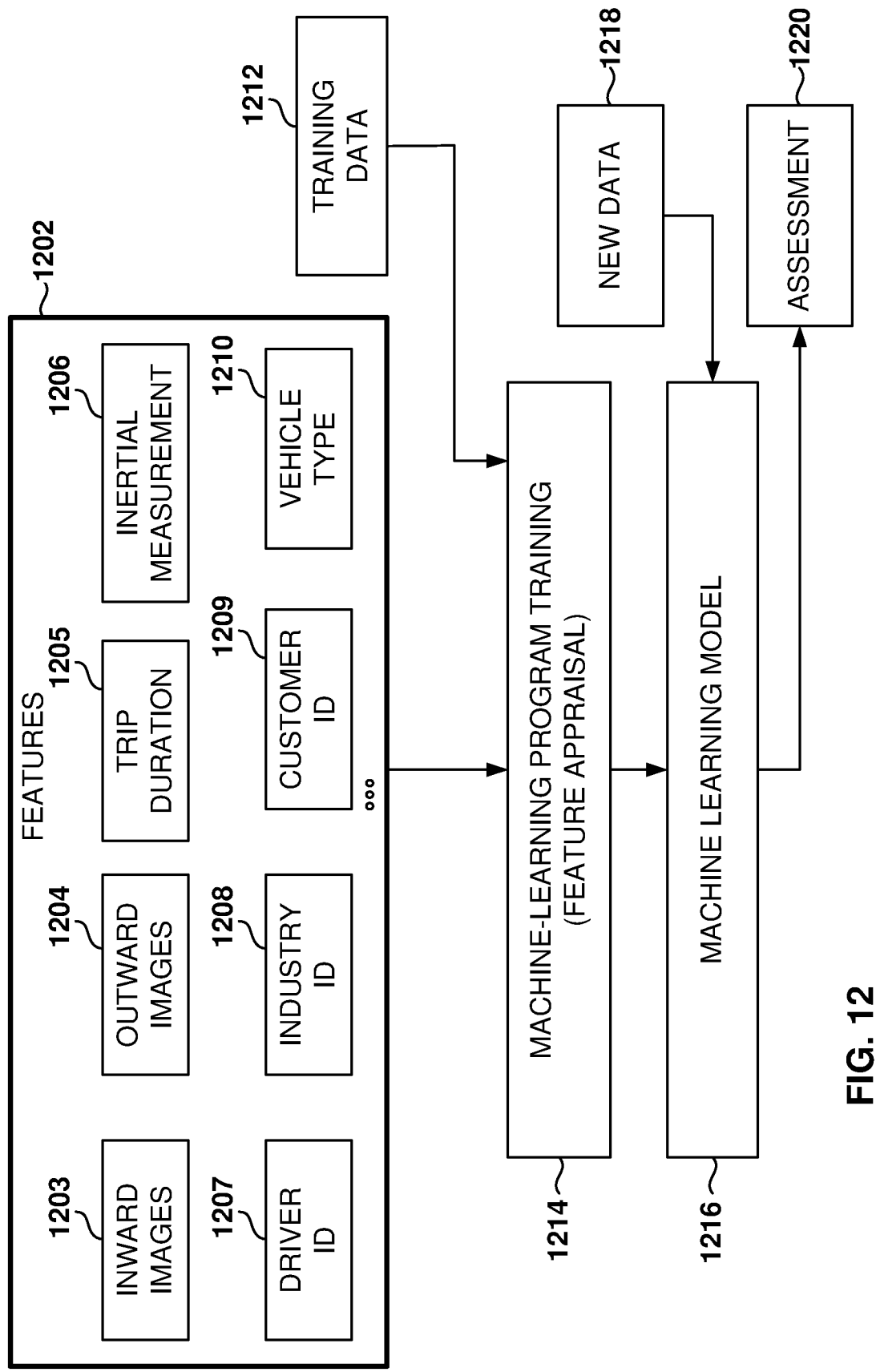
FIG. 12 illustrates the training and use of a machine-learning model, according to some example examples.

FIG. 12 illustrates the training and use of a machine-learning model 1216, according to some example examples. In some examples, machine learning (ML) models 1216 are utilized to perform operations associated with detecting driving while drowsy.

Machine Learning (ML) is an application that provides computer systems the ability to perform tasks without explicitly being programmed by making inferences based on patterns found in the analysis of data. Machine learning explores the study and construction of algorithms, also referred to herein as tools, that may learn from existing data and make predictions about new data. Such machine-learning algorithms operate by building an ML model 1216 from training data 1212 in order to make data-driven predictions or decisions expressed as outputs or assessments 1220. Although examples are presented with respect to a few machine-learning tools, the principles presented herein may be applied to other machine-learning tools.

Data representation refers to the method of organizing the data for storage on a computer system, including the structure for the identified features and their values. In ML, it is typical to represent the data in vectors or matrices of two or more dimensions. When dealing with large amounts of data and many features, data representation is essential so that the training is able to identify the correlations within the data.

There are two common modes for ML: supervised ML and unsupervised ML. Supervised ML uses prior knowledge (e.g., examples that correlate inputs to outputs or outcomes) to learn the relationships between the inputs and the outputs. The goal of supervised ML is to learn a function that, given some training data, best approximates the relationship between the training inputs and outputs so that the ML model can implement the same relationships when given inputs to generate the corresponding outputs. Unsupervised ML is the training of an ML algorithm, using information that is neither classified nor labeled and allowing the algorithm to act on that information without guidance. Unsupervised ML is useful in exploratory analysis because it can automatically identify structure in data.

Typical tasks for supervised ML are classification problems and regression problems. Classification problems, also referred to as categorization problems, aim to classify items into one of several category values (for example, is this object an apple or an orange?). Regression algorithms aim to quantify some items (for example, by providing a score to the value of some input). Some examples of commonly used supervised ML algorithms are Logistic Regression (LR), Naive-Bayes, Random Forest (RF), neural networks (NN), deep neural networks (DNN), matrix factorization, and Support Vector Machines (SVM).

Some typical tasks for unsupervised ML include clustering, representation learning, and density estimation. Some examples of commonly used unsupervised ML algorithms are K-means clustering, principal component analysis, and autoencoders. In some examples, ML model 1216 outputs a value in the drowsiness scale index for a time window (e.g., last ten seconds).

The training data 1212 comprises examples of values for the features 1202. In some examples, the training data comprises labeled data with examples of values for the features 1202 and labels indicating the outcome, such as drowsiness detected. The machine-learning algorithms utilize the training data 1212 to find correlations among identified features 1202 that affect the outcome. A feature 1202 is an individual measurable property of a phenomenon being observed. The concept of a feature is related to that of an explanatory variable used in statistical techniques such as linear regression. Choosing informative, discriminating, and independent features is essential for the effective operation of ML in pattern recognition, classification, and regression. Features may be of different types, such as numeric, strings, categorical, and graph. A categorical feature is a feature that may be assigned a value from a plurality of predetermined possible values (e.g., this animal is a dog, a cat, or a bird).

In one example, the features 1202 may be of different types and may include one or more of inward images 1203 from inward videos, outward images 1204 from outward videos, trip duration at the time of the event 1205, inertial measurements 1206, driver identifier 1207 (ID), industry ID 1208, customer ID 1209, vehicle type 1210, etc. The industry ID provides valuable information, as different industries tend to have different requirements associated with types of vehicles, duration of trips, number of stops, etc. Some examples of types of industry include transportation & warehousing, wholesale trade, field services, passenger transit, construction, consumer products, retail trade, food & beverage, manufacturing, health care & social assistance, etc.

During training 1214, the ML program also referred to as ML algorithm or ML tool, analyzes the training data 1212 based on identified features 1202 and configuration parameters defined for the training. The result of the training 1214 is the ML model 1216, which is capable of taking inputs to produce assessments.

Training an ML algorithm involves analyzing large amounts of data (e.g., from several gigabytes to a terabyte or more) in order to find data correlations. The ML algorithms utilize the training data 1212 to find correlations among the identified features 1202 that affect the outcome or assessment 1220. In some examples, the training data 1212 includes labeled data, which is known data for one or more identified features 1202 and one or more outcomes, such as the value in the drowsiness scale index.

The ML algorithms usually explore many possible functions and parameters before finding what the ML algorithms identify to be the best correlations within the data; therefore, training may make use of large amounts of computing resources and time.

When the ML model 1216 is used to perform an assessment, new data 1218 is provided as input to the ML model 1216, and the ML model 1216 generates the assessment 1220 as output. For example, when analyzing the different inputs for a ten-second window (e.g., inward frames, outward frames), the ML model 1216 calculates the value in the drowsiness scale.

In some examples, results obtained by the model 1216 during operation (e.g., assessment 1220 produced by the model in response to inputs) are used to improve the training data 1212, which is then used to generate a newer version of the model. Thus, a feedback loop is formed to use the results obtained by the model to improve the model. In some examples, the ML program is one of ResNet model or a video transformer, but other examples may utilize other types of models.

Feature extraction is a process that reduces the amount of resources required to describe a large set of data. When performing analysis of complex data, one of the major problems stems from the number of variables involved. Analysis with a large number of variables generally requires a large amount of memory and computational power, and it may cause a classification algorithm to overfit training samples and generalize poorly to new samples. Feature extraction includes constructing combinations of variables to get around these large-data-set problems while still describing the data with sufficient accuracy for the desired purpose.

In some examples, feature extraction starts from an initial set of measured data and builds derived values (features) intended to be informative and non-redundant, facilitating the subsequent learning and generalization steps. Further, feature extraction is related to dimensionality reduction, such as reducing large vectors (sometimes with very sparse data) to smaller vectors capturing the same or a similar amount of information.

Figure 13:
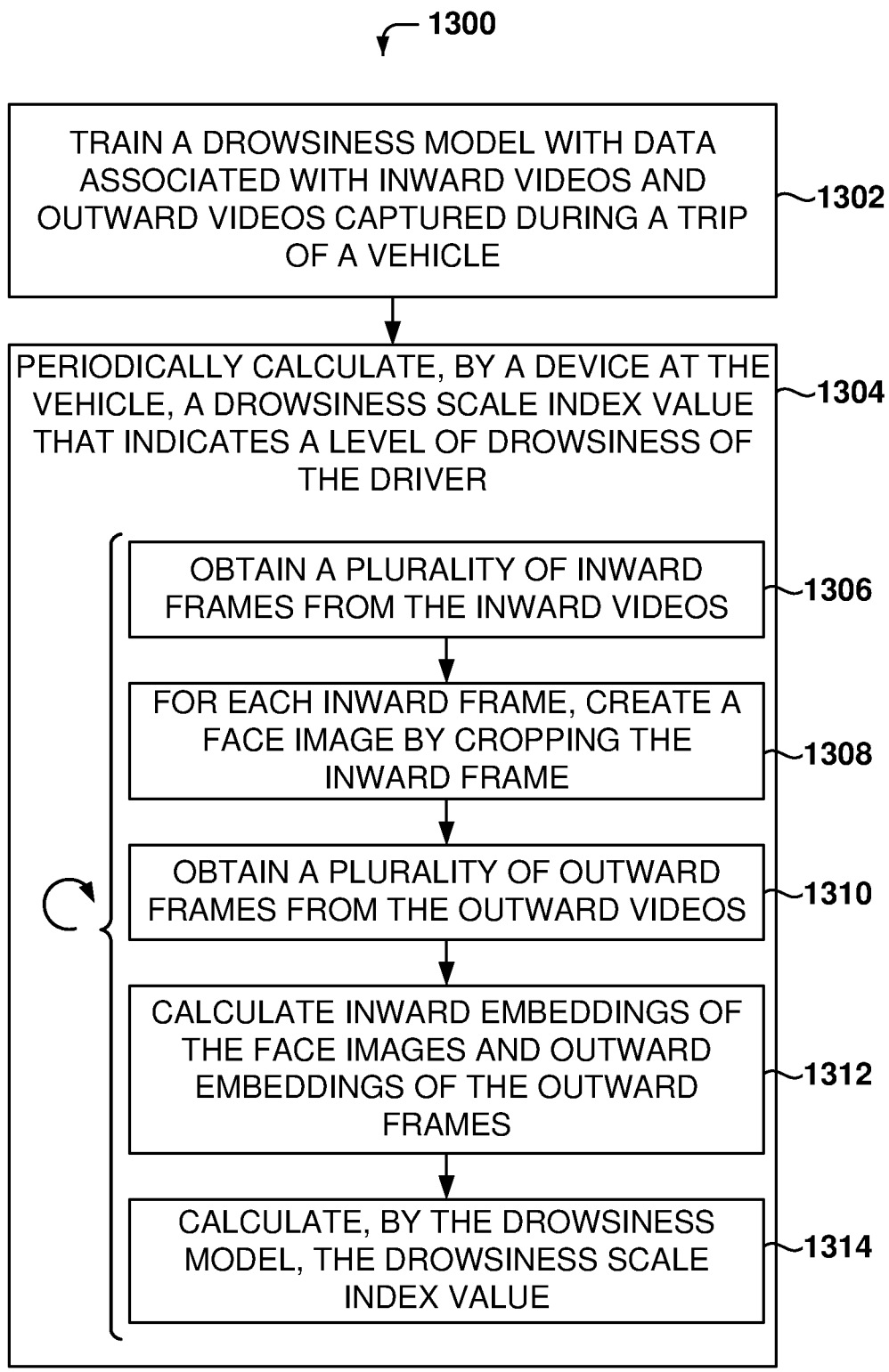
FIG. 13 is a flowchart of a method for detecting when drivers are drowsy while driving, according to some examples.

FIG. 13 is a flowchart of a method 1300 for the management of drowsiness on vehicles, according to some examples. While the various operations in this flowchart are presented and described sequentially, one of ordinary skill will appreciate that some or all of the operations may be executed in a different order, be combined or omitted, or be executed in parallel.

Operation 1302 is for training a drowsiness model with data associated with inward videos and outward videos captured during a trip of a vehicle.

From operation 1302, method 1300 flows to operation 1304 for periodically calculating, by a device at the vehicle, a drowsiness scale index value that indicates a level of drowsiness of the driver. Calculating the drowsiness scale index value comprises operations 1304, 1306, 1308, 1310, 1312, and 1314.

At operation 1306, a plurality of inward frames is obtained from the inward videos. For example, the system may incorporate frame sampling based on regular time intervals or event-based triggers, ensuring that the most relevant frames are captured for analysis. Additionally, pre-processing techniques such as noise reduction and contrast enhancement may be applied to improve the clarity and quality of the inward video frames.

From operation 1306, method 1300 flows to operation 1308 for creating, for each inward frame, a face image by cropping the inward frame. In some examples, the system applies one or more facial detection algorithms to accurately locate the driver's face within each inward frame. Adaptive cropping mechanisms may also be implemented to maintain focus on the driver's face despite any movement, ensuring that essential facial features are consistently captured for subsequent processing.

From operation 1308, method 1300 flows to operation 1310 for obtaining a plurality of outward frames from the outward videos. Outward frames could be selected based on specific events or changes in the external driving environment, with pre-processing adjustments made to highlight road conditions and potential hazards. In some examples, synchronization of outward frames with inward frames provides comprehensive temporal analysis of both the driver's behavior and the external driving context.

From operation 1310, method 1300 flows to operation 1312 for calculating inward embeddings of the face images and outward embeddings of the outward frames. In some examples, feature extraction may leverage a deep learning model, such as a convolutional neural network (CNN), to produce inward embeddings that accurately represent the driver's state. For outward frames, dimensionality reduction techniques could be applied to distill critical driving context information into outward embeddings, which are then normalized to ensure compatibility with the drowsiness classification model.

From operation 1312, method 1300 flows to operation 1314 for calculating, by the drowsiness model, the drowsiness scale index value. In some examples, the drowsiness model comprises a neural network trained to identify drowsiness-related patterns from embeddings, calculates the drowsiness scale index value. For example, the model may prioritize features within the embeddings that are strongly associated with fatigue, using a classification algorithm to assign the driver's state to categories such as 'alert' or 'very drowsy'. To capture changes in alertness over time, the model incorporates elements like recurrent neural networks (RNNs) or long short-term memory (LSTM) units, allowing it to consider both current and historical data.

In some examples, the drowsiness model comprises a face deep feature extraction network and a drowsiness classifier, where the face deep feature extraction network calculates the inward embedding for each face image.

In some examples, the drowsiness classifier receives as input a plurality of inward embeddings generated by the face deep feature extraction network and a plurality of outward embeddings, where the drowsiness classifier outputs the drowsiness scale index value.

In some examples, the drowsiness scale comprises values of one for very alert, two for fairly alert, three for signs of sleepiness, four for sleepy, and five for very sleepy.

In some examples, the drowsiness model is based on features comprising one or more of inward images from inward videos, outward images from outward videos, trip duration at the time of the event, inertial measurements, driver identifier, industry identifier, customer identifier, or vehicle type.

In some examples, method 1300 further comprises detecting a state of drowsiness of the driver based on the drowsiness scale index value and issuing an audio alert to the driver.

In some examples, the inward videos are videos of the inside of a cabin that includes the driver, and the outward videos capture a view in front of the vehicle in a direction of travel.

In some examples, each calculation of the drowsiness scale index value is based on ten inward embeddings and ten outward embeddings.

In some examples, the inward frames are sampled from the inward video at a frequency of two inward frames per second and a window of ten seconds is used to calculate the drowsiness scale index value.

In some examples, the drowsiness scale index value is calculated at a predetermined frequency, the predetermined frequency being in a range from once a second to five times a second.

In some examples, the drowsiness model includes a ResNet (Residual Network) classifier.

Another general aspect is for a system that includes a memory comprising instructions and one or more computer processors. The instructions, when executed by the one or more computer processors, cause the one or more computer processors to perform operations comprising: training a drowsiness model with data associated with inward videos and outward videos captured during a trip of a vehicle, the inward videos being videos of an inside of a cabin that includes a driver, the outward videos capturing a view in front of the vehicle in a direction of travel; periodically calculating, by a device at the vehicle, a drowsiness scale index value that indicates a level of drowsiness of the driver, wherein calculating the drowsiness scale index value comprises: obtaining a plurality of inward frames from the inward videos; for each inward frame, creating a face image by cropping the inward frame; obtaining a plurality of outward frames from the outward videos; calculating inward embeddings of the face images and outward embeddings of the outward frames; and calculating, by the drowsiness model, the drowsiness scale index value.

In yet another general aspect, a tangible machine-readable storage medium (e.g., a non-transitory storage medium) includes instructions that, when executed by a machine, cause the machine to perform operations comprising: training a drowsiness model with data associated with inward videos and outward videos captured during a trip of a vehicle, the inward videos being videos of an inside of a cabin that includes a driver, the outward videos capturing a view in front of the vehicle in a direction of travel; periodically calculating, by a device at the vehicle, a drowsiness scale index value that indicates a level of drowsiness of the driver, wherein calculating the drowsiness scale index value comprises: obtaining a plurality of inward frames from the inward videos; for each inward frame, creating a face image by cropping the inward frame; obtaining a plurality of outward frames from the outward videos; calculating inward embeddings of the face images and outward embeddings of the outward frames; and calculating, by the drowsiness model, the drowsiness scale index value.

Figure 14:
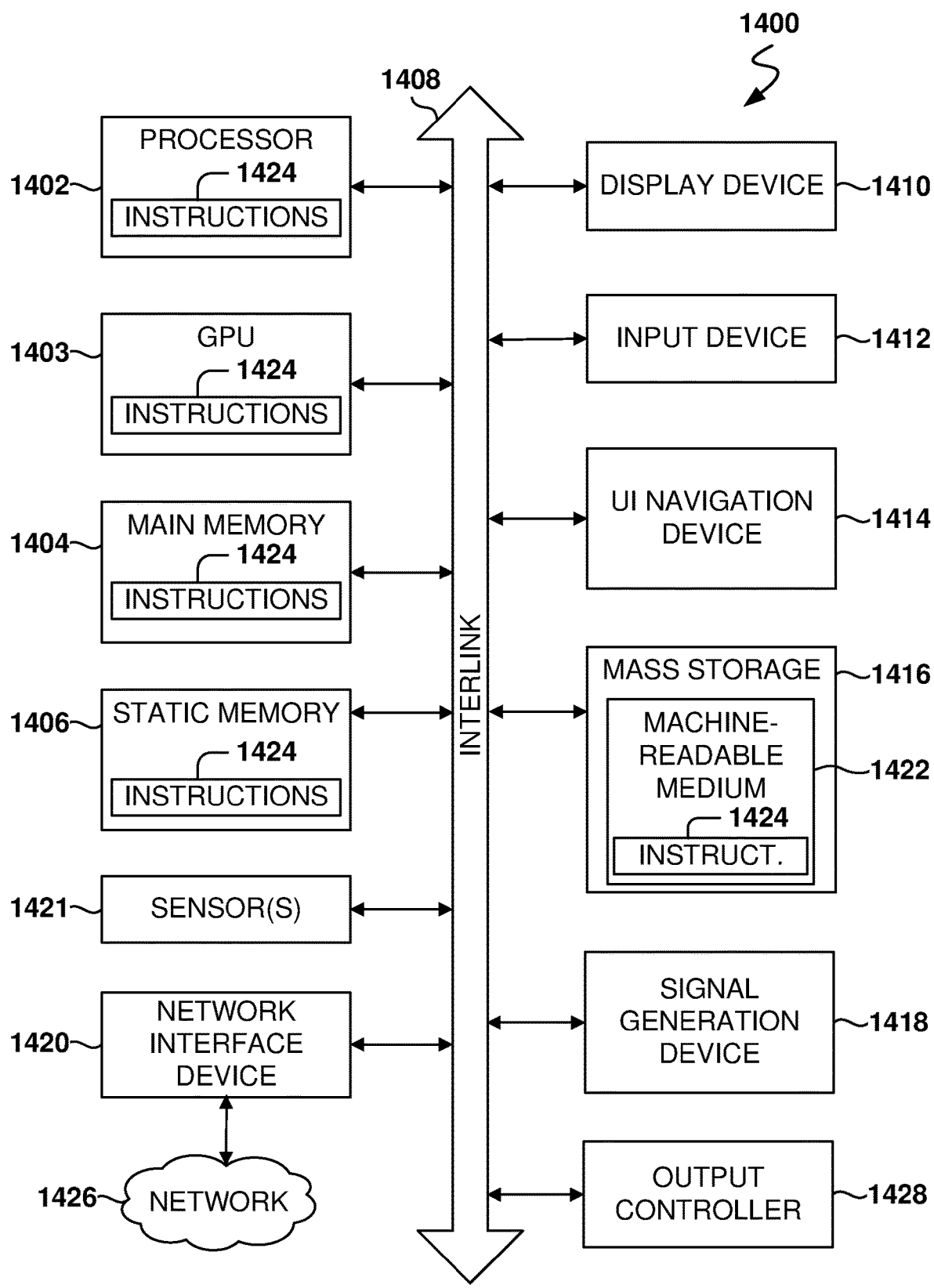
FIG. 14 is a block diagram illustrating an example of a machine upon or by which one or more example process examples described herein may be implemented or controlled.

FIG. 14 is a block diagram illustrating an example of a machine 1400 upon or by which one or more example process examples described herein may be implemented or controlled. In alternative examples, the machine 1400 may operate as a standalone device or be connected (e.g., networked) to other machines. In a networked deployment, the machine 1400 may operate in the capacity of a server machine, a client machine, or both in server-client network environments. In an example, the machine 1400 may act as a peer machine in a peer-to-peer (P2P) (or other distributed) network environment. Further, while only a single machine 1400 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, various components, or mechanisms. Circuitry is a collection of circuits implemented in tangible entities, including hardware (e.g., simple circuits, gates, logic). Circuitry membership may be flexible over time and underlying hardware variability. Circuitries include members that may, alone or in combination, perform specified operations when operating. In an example, the hardware of the circuitry may be immutably designed to carry out a specific operation (e.g., hardwired). In an example, the hardware of the circuitry may include variably connected physical components (e.g., execution units, transistors, simple circuits), including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other circuitry components when the device operates. In an example, any of the physical components may be used in more than one member of more than one circuitry. For example, under operation, execution units may be used in a first circuit of a first circuitry at one point in time and reused by a second circuit in the first circuitry or by a third circuit in a second circuitry at a different time.

The machine 1400 (e.g., computer system) may include a hardware processor 1402 (e.g., a central processing unit (CPU), a hardware processor core, or any combination thereof), a graphics processing unit (GPU 1403), a main memory 1404, and a static memory 1406, some or all of which may communicate with each other via an interlink 1408 (e.g., bus). The machine 1400 may further include a display device 1410, an alphanumeric input device 1412 (e.g., a keyboard), and a user interface (UI) navigation device 1414 (e.g., a mouse). In an example, the display device 1410, alphanumeric input device 1412, and UI navigation device 1414 may be a touch screen display. The machine 1400 may additionally include a mass storage device 1416 (e.g., drive unit), a signal generation device 1418 (e.g., a speaker), a network interface device 1420, and one or more sensors 1421, such as a Global Positioning System (GPS) sensor, compass, accelerometer, or another sensor. The machine 1400 may include an output controller 1428, such as a serial (e.g., universal serial bus (USB)), parallel, or other wired or wireless (e.g., infrared (IR), near field communication (NFC)) connection to communicate with or control one or more peripheral devices (e.g., a printer, card reader).

The processor 1402 refers to any one or more circuits or virtual circuits (e.g., a physical circuit emulated by logic executing on an actual processor) that manipulates data values according to control signals (e.g., commands, opcodes, machine code, control words, macroinstructions, etc.) and which produces corresponding output signals that are applied to operate a machine. A processor 1402 may, for example, include at least one of a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), a Tensor Processing Unit (TPU), a Neural Processing Unit (NPU), a Vision Processing Unit (VPU), a Machine Learning Accelerator, an Artificial Intelligence Accelerator, an Application Specific Integrated Circuit (ASIC), a Field Programmable Gate Array (FPGA), a Radio-Frequency Integrated Circuit (RFIC), a Neuromorphic Processor, a Quantum Processor, or any combination thereof.

The processor 1402 may further be a multi-core processor having two or more independent processors (sometimes referred to as "cores") that may execute instructions contemporaneously. Multi-core processors contain multiple computational cores on a single integrated circuit die, each of which can independently execute program instructions in parallel. Parallel processing on multi-core processors may be implemented via architectures like superscalar, VLIW, vector processing, or SIMD that allow each core to run separate instruction streams concurrently. The processor 1402 may be emulated in software, running on a physical processor, as a virtual processor or virtual circuit. The virtual processor may behave like an independent processor but is implemented in software rather than hardware.

The mass storage device 1416 may include a machine-readable medium 1422 on which one or more sets of data structures or instructions 1424 (e.g., software) embodying or utilized by any of the techniques or functions described herein. The instructions 1424 may also reside, completely or at least partially, within the main memory 1404, within the static memory 1406, within the hardware processor 1402, or the GPU 1403 during execution thereof by the machine 1400. For example, one or any combination of the hardware processor 1402, the GPU 1403, the main memory 1404, the static memory 1406, or the mass storage device 1416 may constitute machine-readable media.

While the machine-readable medium 1422 is illustrated as a single medium, the term "machine-readable medium" may include a single medium or multiple media (e.g., a centralized or distributed database and associated caches and servers) configured to store one or more instructions 1424.

The term "machine-readable medium" may include any medium that is capable of storing, encoding, or carrying instructions 1424 for execution by the machine 1400 and that causes the machine 1400 to perform any one or more of the techniques of the present disclosure or that is capable of storing, encoding, or carrying data structures used by or associated with such instructions 1424. Non-limiting machine-readable medium examples may include solid-state memories and optical and magnetic media. For example, a massed machine-readable medium comprises a machine-readable medium 1422 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1424 may be transmitted or received over a communications network 1426 using a transmission medium via the network interface device 1420.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented separately. These and other variations, modifications, additions, and improvements fall within the scope of the subject matter herein.

The examples illustrated herein are described in sufficient detail to enable those skilled in the art to practice the teachings disclosed. Other examples may be used and derived therefrom, such that structural and logical substitutions and changes may be made without departing from the scope of this disclosure. The Detailed Description, therefore, is not to be taken in a limiting sense, and the scope of various examples is defined only by the appended claims, along with the full range of equivalents to which such claims are entitled.

Additionally, as used in this disclosure, phrases of the form "at least one of an A, a B, or a C," "at least one of A, B, and C," and the like should be interpreted to select at least one from the group that comprises "A, B, and C." Unless explicitly stated otherwise in connection with a particular instance, in this disclosure, this manner of phrasing does not mean "at least one of A, at least one of B, and at least one of C." As used in this disclosure, the example "at least one of an A, a B, or a C" would cover any of the following selections: {A}, {B}, {C}, {A, B}, {A, C}, {B, C}, and {A, B, C}.

Moreover, plural instances may be provided for resources, operations, or structures described herein as a single instance. Additionally, boundaries between various resources, operations, modules, engines, and data stores are somewhat arbitrary, and particular operations are illustrated in the context of specific illustrative configurations. Other allocations of functionality are envisioned and may fall within the scope of various examples of the present disclosure. In general, structures and functionality presented as separate resources in the example; configurations may be implemented as a combined structure or resource. Similarly, structures and functionality presented as a single resource may be implemented as separate resources. These and other variations, modifications, additions, and improvements fall within a scope of examples of the present disclosure as represented by the appended claims. Accordingly, the specification and drawings are to be regarded in an illustrative rather than a restrictive sense.

What is claimed is:

1. A computer-implemented method comprising:
   training a drowsiness model with data associated with inward videos and outward videos captured during a trip of a vehicle; and
   periodically calculating, by a device at the vehicle, a drowsiness scale index value that indicates a level of drowsiness of a driver, wherein calculating the drowsiness scale index value comprises:
   obtaining a plurality of inward frames from the inward videos;
   for each inward frame, creating a face image by cropping the inward frame;

obtaining a plurality of outward frames from the outward videos;
calculating inward embeddings of the face images and outward embeddings of the outward frames; and
calculating, by the drowsiness model, the drowsiness scale index value.

2. The method as recited in claim 1, wherein the drowsiness model comprises a face deep feature extraction network and a drowsiness classifier, wherein the face deep feature extraction network calculates the inward embedding for each face image.

3. The method as recited in claim 2, wherein the drowsiness classifier receives as input a plurality of inward embeddings generated by the face deep feature extraction network and a plurality of outward embeddings, wherein the drowsiness classifier outputs the drowsiness scale index value.

4. The method as recited in claim 1, wherein a drowsiness scale comprises values of one for very alert, two for fairly alert, three for signs of sleepiness, four for sleepy, and five for very sleepy.

5. The method as recited in claim 1, wherein the drowsiness model is based on features comprising one or more of inward images from inward videos, outward images from outward videos, trip duration at time of event, inertial measurements, driver identifier, industry identifier, customer identifier, or vehicle type.

6. The method as recited in claim 1, further comprising:
detecting a state of drowsiness of the driver based on the drowsiness scale index value; and
issuing an audio alert to the driver.

7. The method as recited in claim 1, wherein the inward videos are videos of an inside of a cabin that includes the driver, wherein the outward videos capture a view in front of the vehicle in a direction of travel.

8. The method as recited in claim 1, wherein each calculation of the drowsiness scale index value is based on ten inward embeddings and ten outward embeddings.

9. The method as recited in claim 1, wherein the inward frames are sampled from the inward video at a frequency of two inward frames per second and a window of ten seconds is used to calculate the drowsiness scale index value.

10. The method as recited in claim 1, wherein the drowsiness scale index value is calculated at a predetermined frequency, the predetermined frequency being in a range from once a second to five times a second.

11. The method as recited in claim 1, wherein the drowsiness model includes a ResNet (Residual Network) classifier.

12. A system comprising:
a memory comprising instructions; and
one or more computer processors, wherein the instructions, when executed by the one or more computer processors, cause the system to perform operations comprising:
training a drowsiness model with data associated with inward videos and outward videos captured during a trip of a vehicle; and
periodically calculating, by a device at the vehicle, a drowsiness scale index value that indicates a level of drowsiness of a driver, wherein calculating the drowsiness scale index value comprises:
obtaining a plurality of inward frames from the inward videos;
for each inward frame, creating a face image by cropping the inward frame;
obtaining a plurality of outward frames from the outward videos;
calculating inward embeddings of the face images and outward embeddings of the outward frames; and
calculating, by the drowsiness model, the drowsiness scale index value.

13. The system as recited in claim 12, wherein the drowsiness model comprises a face deep feature extraction network and a drowsiness classifier, wherein the face deep feature extraction network calculates the inward embedding for each face image.

14. The system as recited in claim 13, wherein the drowsiness classifier receives as input a plurality of inward embeddings generated by the face deep feature extraction network and a plurality of outward embeddings, wherein the drowsiness classifier outputs the drowsiness scale index value.

15. The system as recited in claim 12, wherein a drowsiness scale comprises values of one for very alert, two for fairly alert, three for signs of sleepiness, four for sleepy, and five for very sleepy.

16. The system as recited in claim 12, wherein the drowsiness model is based on features comprising one or more of inward images from inward videos, outward images from outward videos, trip duration at time of event, inertial measurements, driver identifier, industry identifier, customer identifier, or vehicle type.

17. A non-transitory machine-readable storage medium including instructions that, when executed by a machine, cause the machine to perform operations comprising:
training a drowsiness model with data associated with inward videos and outward videos captured during a trip of a vehicle; and
periodically calculating, by a device at the vehicle, a drowsiness scale index value that indicates a level of drowsiness of a driver, wherein calculating the drowsiness scale index value comprises:
obtaining a plurality of inward frames from the inward videos;
for each inward frame, creating a face image by cropping the inward frame;
obtaining a plurality of outward frames from the outward videos;
calculating inward embeddings of the face images and outward embeddings of the outward frames; and
calculating, by the drowsiness model, the drowsiness scale index value.

18. The non-transitory machine-readable storage medium as recited in claim 17, wherein the drowsiness model comprises a face deep feature extraction network and a drowsiness classifier, wherein the face deep feature extraction network calculates the inward embedding for each face image.

19. The non-transitory machine-readable storage medium as recited in claim 18, wherein the drowsiness classifier receives as input a plurality of inward embeddings generated by the face deep feature extraction network and a plurality of outward embeddings, wherein the drowsiness classifier outputs the drowsiness scale index value.

20. The non-transitory machine-readable storage medium as recited in claim 17, wherein a drowsiness scale comprises values of one for very alert, two for fairly alert, three for signs of sleepiness, four for sleepy, and five for very sleepy.

* * * * *